US011991418B1

(12) United States Patent
McCarty et al.

(10) Patent No.: US 11,991,418 B1
(45) Date of Patent: May 21, 2024

(54) METHODS AND APPARATUS FOR MODIFYING AN AUGMENTED AND/OR VIRTUAL REALITY EXPERIENCE

(71) Applicant: Nevermind Capital LLC, Wilmington, DE (US)

(72) Inventors: Matt McCarty, Irvine, CA (US); Hector Medina, Laguna Beach, CA (US); David Cole, Aliso Viejo, CA (US); Alan Moss, Laguna Beach, CA (US)

(73) Assignee: Nevermind Capital LLC, Wilmington, DE (US)

( * ) Notice: Subject to any disclaimer, the term of this patent is extended or adjusted under 35 U.S.C. 154(b) by 0 days.

(21) Appl. No.: 16/510,869

(22) Filed: Jul. 12, 2019

Related U.S. Application Data

(60) Provisional application No. 62/697,408, filed on Jul. 13, 2018, provisional application No. 62/697,404, filed on Jul. 13, 2018, provisional application No. 62/697,290, filed on Jul. 12, 2018.

(51) Int. Cl.
*H04N 21/472* (2011.01)
*G06F 3/01* (2006.01)
*H04N 21/422* (2011.01)

(52) U.S. Cl.
CPC ....... *H04N 21/47217* (2013.01); *G06F 3/011* (2013.01); *H04N 21/42202* (2013.01)

(58) Field of Classification Search
CPC ................... H04N 21/42202; H04N 21/47217
USPC ............................................................ 725/38
See application file for complete search history.

(56) References Cited

U.S. PATENT DOCUMENTS

| 7,565,680 B1* | 7/2009 | Asmussen | H04N 21/4223 |
| | | | 725/135 |
| 11,863,510 B2* | 1/2024 | Yoon | H04W 8/005 |
| 2003/0046557 A1* | 3/2003 | Miller | G06F 21/41 |
| | | | 713/186 |
| 2005/0028204 A1* | 2/2005 | Nakamura | G11B 27/34 |
| | | | 725/45 |
| 2005/0198040 A1* | 9/2005 | Cohen | H04L 12/2838 |
| 2011/0243533 A1* | 10/2011 | Stern | H04N 21/25866 |
| | | | 386/278 |
| 2016/0134918 A1* | 5/2016 | Chen | H04N 21/43615 |
| | | | 725/133 |
| 2019/0149873 A1* | 5/2019 | DiVerdi | H04N 21/47217 |
| | | | 725/38 |
| 2020/0225474 A1* | 7/2020 | Shim | G06F 3/011 |

* cited by examiner

*Primary Examiner* — Dominic D Saltarelli
(74) *Attorney, Agent, or Firm* — Blank Rome LLP

(57) ABSTRACT

Methods and apparatus for implementing a playback system capable of operating as a virtual or augmented reality device are described. In various embodiment one or more environmental triggers are detected and an action is taken based on the detected trigger, user input and/or other environmental conditions. The methods allow a user who is subject to an immersive experience to smoothly transition in/or out of the virtual environment and respond to environmental triggers which may require a user to take an action.

16 Claims, 13 Drawing Sheets

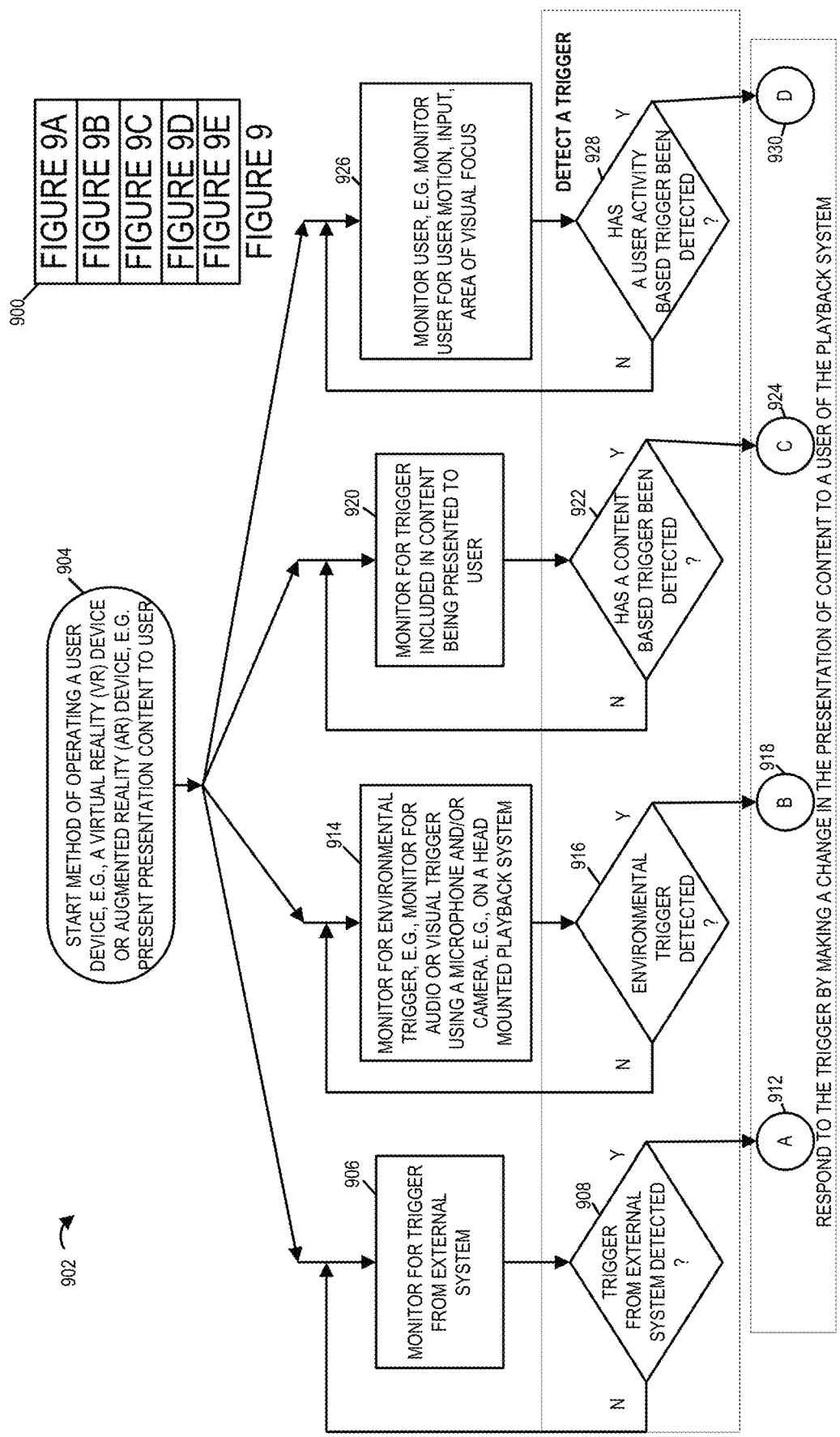

METHODS AND APPARATUS FOR MODIFYING AN AUGMENTED AND/OR VIRTUAL REALITY EXPERIENCE

RELATED APPLICATIONS

The present application claims the benefit of U.S. Provisional Application Ser. No. 62/697,290 which was filed on Jul. 12, 2018 and the benefit of U.S. Provisional Application Ser. No. 62/697,404 which was filed on Jul. 13, 2018 and the benefit of U.S. Provisional Application Ser. No. 62/697,408 which was filed on Jul. 13, 2018 with each of the preceding patent application hereby being expressly incorporated by reference in their entirety.

FIELD

The present invention relates to methods and apparatus for capturing, streaming and/or playback of content, e.g., content which can be used to simulate a 3D environment.

BACKGROUND

Content playback systems may provide an augmented reality experience where a user views all or a portion of his surroundings along with some additional content, e.g., information or images which are combined with the visual content obtained from the user's actual surroundings. In the case of immersive content playback, content which shows captured or synthetically generated images normally occupies a user's full field of view with the user's view of the user's actual surroundings being completely obscured.

Depending on environmental conditions and/or other factors it may be a user of a playback device aware of what is going on in his/her surrounding or to interrupt playback of content to provide a user an opportunity to take an action. Unfortunately, an interruption where a user must remove his/her head mounted display to take an action or an interruption which is difficult to transition back to the playback content can take away from the overall experience.

In view of the above it should be appreciated that there is need for methods and/or apparatus which would allow a user to be easily informed of an environmental condition to take an action and then easily transition back to the mode of playback operation the user was experiencing before the interruption.

SUMMARY

A content playback system and method which support multiple modes of operation including augmented reality and full immersive modes of operation are described. The playback system includes a support, e.g., strap, to which a display can be secured, which can be attached or worn on a user's head. The support supports a head mounted display included in the playback system. The playback system further includes a processor for controlling the system and an interface for receiving content and/or alerts, e.g., alarms, from other devices such as an alarm system, doorbell system, etc. The processor can be supported by the support and worn by the user in a head mounted playback system embodiment or may be coupled to the display by a cable or wirelessly, e.g., in cases where the processor is the processor of a game system. The interface of the playback system supports wireless and/or wired communications. In some embodiment the playback system includes a camera facing away from the user, e.g., mounted on the head mounted display and a microphone which may also be supported by the support and/or mounted on the head mounted display.

The playback system can receive audio via the microphone and capture images, e.g., video, of an area in front of the user of the playback system. The images can be displayed on the head mounted display to fully occupy the entire display or a portion of the display. Speakers are included and are used to play audio content to the user and present the user with audio messages/information. In some embodiments one or more portions of the display can be made fully or partially transparent. In such cases rather than display captured images the user may see through the display and view the area in front of the display with the transparent portion of the display acting as a window through which the room or other environment in which the user is physically located can be viewed. When operating in augmented reality mode, content is displayed on at least portion of the display in addition to the image of the environment or on top of the display window through which the user views the environment. Thus in augmented reality (AR) mode the user is still presented with an opportunity to view and sense the environment in which the user is located. In immersive mode the display device blocks the view of the environment with content and/or images output by the playback device occupying the full viewing area presented to the user and with audio generated by the speakers being presented to the user in embodiments where audio is part of the immersive content being presented. During immersive mode, the user may become unaware of what is going on around him in the actual surroundings in which the user is located.

While from a user experience a fully immersive experience can be highly entertaining and desirable, there are times when it can be important that a user be made aware of what is going on in his surroundings and/or presented with various control options. Accordingly there is a need for methods and/or apparatus which control the playback device to switch between various modes of operation, e.g., between immersive modes of operation and augmented reality modes of operation. While a user may be unaware of what is going on in his/her surroundings during immersive mode of operation, depending on the reason the user is switched into AR mode operation the degree to which the user's immersive experience is interrupted should reflect the reason for the transition to the AR mode of operation.

In accordance with various features of the invention the playback device monitors for one or more triggers that can trigger the playback device to switch between AR and full immersive modes of operation. The action taken in response to the triggers and/or the trigger for switching back to immersive mode operation may, and in various embodiments does, depend on the reason the user was switched from immersive to AR mode operation. In some embodiments the switch from AR mode to full immersive mode may be a passive trigger such as a user not responding to an option or alert and/or in other cases the switch back may be in response to the initial cause of the trigger ceasing to be present and/or a user providing input indicating a desire to switch back to the full immersive mode of operation.

Various triggers which can cause an automatic switch from a immersive mode of operation to an augmented reality mode of operation or a mode in which the user is presented with a user selectable option while being presented content include, among other things, trigger messages or signals from systems external to the playback system, environmental triggers, and/or content based triggers.

Exemplary external system triggers include signals/messages from external monitoring systems including phone systems, alarm systems, doorbell systems, etc. Phone system may provide the playback system with an incoming call alert.

In response to a call alert trigger, in some embodiments content being presented as part of augmented reality or full immersive mode operation is paused and caller ID information is presented. The user may also be presented with one or more call handling operations such as accept the call, do not answer or send to voice mail. If the user selects to answer the call the pause is maintained until the call is completed at which point normal operation, e.g., AR or full immersive mode operation is resumed.

In response to a doorbell trigger, in some embodiment AR or immersive content presentation is paused, an image of an area captured used to monitor the outside area where the doorbell is located is displayed in a PIP window and the user is provided with an opportunity to communicate with the person at the door via the microphone of the playback system and an external speaker located in proximity to the door bell. After pausing due to a doorbell, normal operation, e.g., AR or immersive operation, is resumed in response to the user completing integration with the person at the door or after the user fails to take action in response to the person at the door, e.g., for a predetermined period of time. Thus in at least some embodiments the users AR or immersive experience is only temporally interrupted and simply ignoring the doorbell will result in the AR or immersive experience automatically resuming if the user does not speak to take another action to respond to the doorbell.

Environmental triggers which may trigger a change in a mode of operation include such things as a person in the room where the user of the playback system is located speaking, e.g., to the user or another person or detection by the playback device of a person or pet entering the room. The detection of a person or pet entering the room or location where a user is located may be made based on audio or video signals detected by the playback device, e.g., via the head mounted camera or microphone.

In response to detection of a person speaking, an AR or immersive experience can be, and sometimes is, paused. However, such an interruption can significantly interfere with a user's AR or particularly fully immersive experience. Accordingly, in at least some embodiments to make the user aware of speech but not significantly interrupt an AR or immersive content playback session, in response to detecting speech, an image from an outward facing camera is displayed on a portion of the display, e.g., in a PIP window, and the audio output of the content is lowered to allow speech to be heard. While an image of the outside environment is shown in the PIP window, content continues to be played and displayed in another portion of the display, e.g., the main portion. In some cases if the user does not take any action to respond to the speech in a predetermined amount of time the PIP window will be closed and normal AR or immersive playback operation will continue. Similarly if speech is not detected in a predetermined amount of time the PIP window will be closed and normal audio level output resumed.

In response to detection of a person or pet entering the area, e.g., room, where a user is located, the user is presented with an image of an outward facing camera or a portion of the display is made transparent to allow the user to see the person entering the room. Audio need not be interrupted and playback can continue without being paused absent the user taking some action in response to the person or pet entering the room. By making the user of the playback device aware of the person or animal entering the room even during full immersive mode operation, the user can respond to the motion of the person or pet to avoid injury if necessary or be sufficiently aware of the person or pet that they can respond in a socially acceptable way without having to remove the head mounted display. This reduces the risk of personal injury to unexpected physical content from a pet or person and also avoids the risk of the person entering the room finding the user's use of the playback device socially unacceptable, e.g., due to the user being unaware of the person and ignoring them.

Content based triggers which are supported include, for example, live broadcast alert triggers, immersive content available version notifications and social viewing, e.g., co-viewing, opportunity notifications. In response to such notifications which may be embedded in or communicated with content being played to the user by the playback device the user is provided with an opportunity to take advantage of the viewing or other opportunity indicated in the notification. The notification may be presented to the user in a PIP window and/or audible during an AR or full immersive viewing mode of operation. If the user ignores the notification, the PIP notification window is removed and the AR or immersive experience continues with relatively little interference from the notification. However if a user selects one of the notification provided viewing options the playback device switches the user selected option, e.g., the live broadcast, immersive version or co-viewing experience selected by the user as indicated by user input, e.g., touching of a touch paid on the head mounted display or via another user input device such as a keypad.

While various alerts and/or operation can be preconfigured and/or indicated in communicated content, user configurable alerts and/or responses can and also are sometimes supported. For example a user may program a device to send an alert at a particular time, signal completion of brewing a pot of coffee by a smart coffee maker or some other intelligent network connected device or system. The action taken in response to such a particular alert can be configured by the user with the playback device resending with a pop-up message or some other action in response to the user configured trigger. For example the user may configure the playback device to pause an immersive content playback experience and display a coffee ready alert, in response to a coffee pot system sending an alert that coffee brewing has been completed.

A list of some example triggers and responses taken by an exemplary playback system is set forth below.

| Type | Trigger | Response |
| --- | --- | --- |
| External System | Incoming Phone call | display Caller ID, present pause indicator |
| External System | Doorbell/Alarm System rings | pause immersive content, reveal external view in PIP window |
| Environment | person speaks to viewer | lower audio, reveal external view in PIP window |

-continued

| Type | Trigger | Response |
| --- | --- | --- |
| Environment | Person/Pet enters room | present image from outward-facing camera |
| Content | Live Broadcast Alert | display program info, present link |
| Content | Immersive version available while in AR | present option to change, close AR view if selected |
| Content | Social co-viewing opportunity | present access |

Numerous variations on the above described methods and apparatus are possible.

BRIEF DESCRIPTION OF THE FIGURES

FIG. 9A is a first part of an exemplary flow chart showing the steps of a method implemented in accordance with one exemplary embodiment.

FIG. 9 is a key showing how FIGS. 9A through 9E are to be combined to form a flow chart showing the steps of an exemplary method implemented by a playback system, such as the system shown in FIG. 3, in accordance with one exemplary embodiment of the invention.

DETAILED DESCRIPTION

Figure 1:
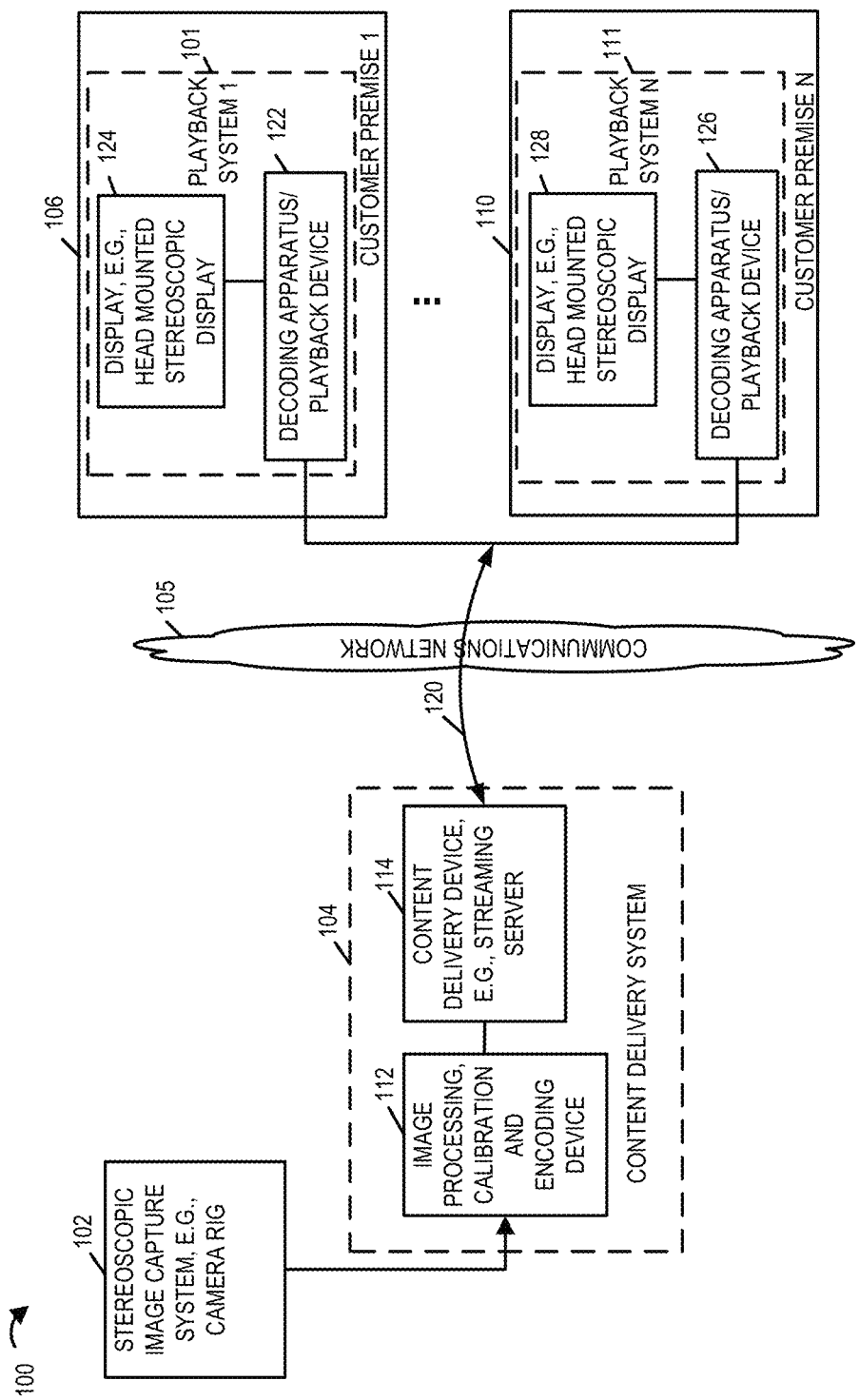
FIG. 1 illustrates an exemplary system implemented in accordance with some embodiments of the invention which can be used to capture, stream content, and output content to one or more users.

FIG. 1 illustrates an exemplary system 100 implemented in accordance with some embodiments of the invention. The system 100 supports content delivery, e.g., imaging content delivery, to one or more customer devices, e.g., playback devices/content players, located at customer premises. The system 100 includes the exemplary image capturing device 102, a content delivery system 104, a communications network 105, and a plurality of customer premises 106, . . . , 110. The image capturing device 102 supports capturing of stereoscopic imagery. The image capturing device 102 captures and processes imaging content in accordance with the features of the invention. The communications network 105 may be, e.g., a hybrid fiber-coaxial (HFC) network, satellite network, and/or internet.

The content delivery system 104 includes an image processing, calibration and encoding apparatus 112 and a content delivery device 114, e.g. a streaming server 114. The image processing, calibration and encoding apparatus 112 is responsible for performing a variety of functions including camera calibration based on one or more target images and/or grid patterns captured during a camera calibration process, generation of a distortion correction or compensation mesh which can be used by a playback device to compensate for distortions introduced by a calibrated camera, processing, e.g., cropping and encoding of captured images, and supplying calibration and/r environmental information to the content delivery device 114 which can be supplied to a playback device and used in the rendering/image playback process. Content delivery device 114 may be implemented as a server with, as will be discussed below, the delivery device responding to requests for content with image calibration information, optional environment information, and one or more images captured by the camera rig 102 which can be used in simulating a 3D environment. Streaming of images and/or content may be and sometimes is a function of feedback information such as viewer head position and/or user selection of a position at the event corresponding to a camera rig 102 which is to be the source of the images. For example, a user may select or switch between images from a camera rig positioned at center line to a camera rig positioned at the field goal with the simulated 3D environment and streamed images being changed to those corresponding to the user selected camera rig. Thus it should be appreciated that a single camera rig 102 is shown in FIG. 1 multiple camera rigs may be present in the system and located at different physical locations at a sporting or other event with the user being able to switch between the different positions and with the user selections being communicated from the playback device 122 to the content server 114. While separate devices 112, 114 are shown in the image processing and content delivery system 104, it should be appreciated that the system may be implemented as a single device including separate hardware for performing the various functions or with different functions being controlled by different software or hardware modules but being implemented in or on a single processor.

The encoding apparatus 112 may, and in some embodiments does, include one or a plurality of encoders for encoding image data in accordance with the invention. The encoders may be used in parallel to encode different portions of a scene and/or to encode a given portion of a scene to generate encoded versions which have different data rates. Using multiple encoders in parallel can be particularly useful when real time or near real time streaming is to be supported.

The content streaming device 114 is configured to stream, e.g., transmit, encoded content to deliver the encoded image content to one or more customer devices, e.g., over the communications network 105. Via the network 105, the content delivery system 104 can send and/or exchange information with the devices located at the customer premises 106, 110 as represented in the figure by the link 120 traversing the communications network 105.

While the encoding apparatus 112 and content delivery server 114 are shown as separate physical devices in the FIG. 1 example, in some embodiments they are implemented as a single device which encodes and streams content. The encoding process may be a 3D, e.g., stereoscopic, image encoding process where information corresponding to left and right eye views of a scene portion are encoded and included in the encoded image data so that 3D image viewing can be supported. The particular encoding method used is not critical to the present application and a wide range of encoders may be used as or to implement the encoding apparatus 112.

Each customer premise 106, 110 may include a plurality of playback systems, e.g., devices/players, e.g., apparatus that can decode and playback/display the imaging content streamed by the content streaming device 114. Customer premise 1 106 includes a playback system 101 that includes a decoding apparatus/playback device 122 coupled to a display device 124. Customer premise N 110 includes a playback system 111 including a decoding apparatus/playback device 126 coupled to a display device 128. In some embodiments the display devices 124, 128 are head mounted stereoscopic display devices. In various embodiments the playback system 101 is a head mounted system supported by a strap that is worn around the user's head. Thus, in some embodiments, customer premise 1 106 includes playback system 1 101 which includes decoding apparatus/playback device 122 coupled to display 124, e.g., a head mounted stereoscopic display, and customer premise N 110 includes playback system N 111 which includes decoding apparatus/playback device 126 coupled to display 128, e.g., a head mounted stereoscopic display.

In various embodiments decoding apparatus 122, 126 present the imaging content on the corresponding display devices 124, 128. The decoding apparatus/players 122, 126 may be devices which are capable of decoding the imaging content received from the content delivery system 104, generate imaging content using the decoded content and rendering the imaging content, e.g., 3D image content, on the display devices 124, 128. Any of the decoding apparatus/playback devices 122, 126 may be used as the decoding apparatus/playback device 800 shown in FIG. 3. A system/playback device such as the one illustrated in FIG. 3 can be used as any of the decoding apparatus/playback devices 122, 126.

Figure 2:
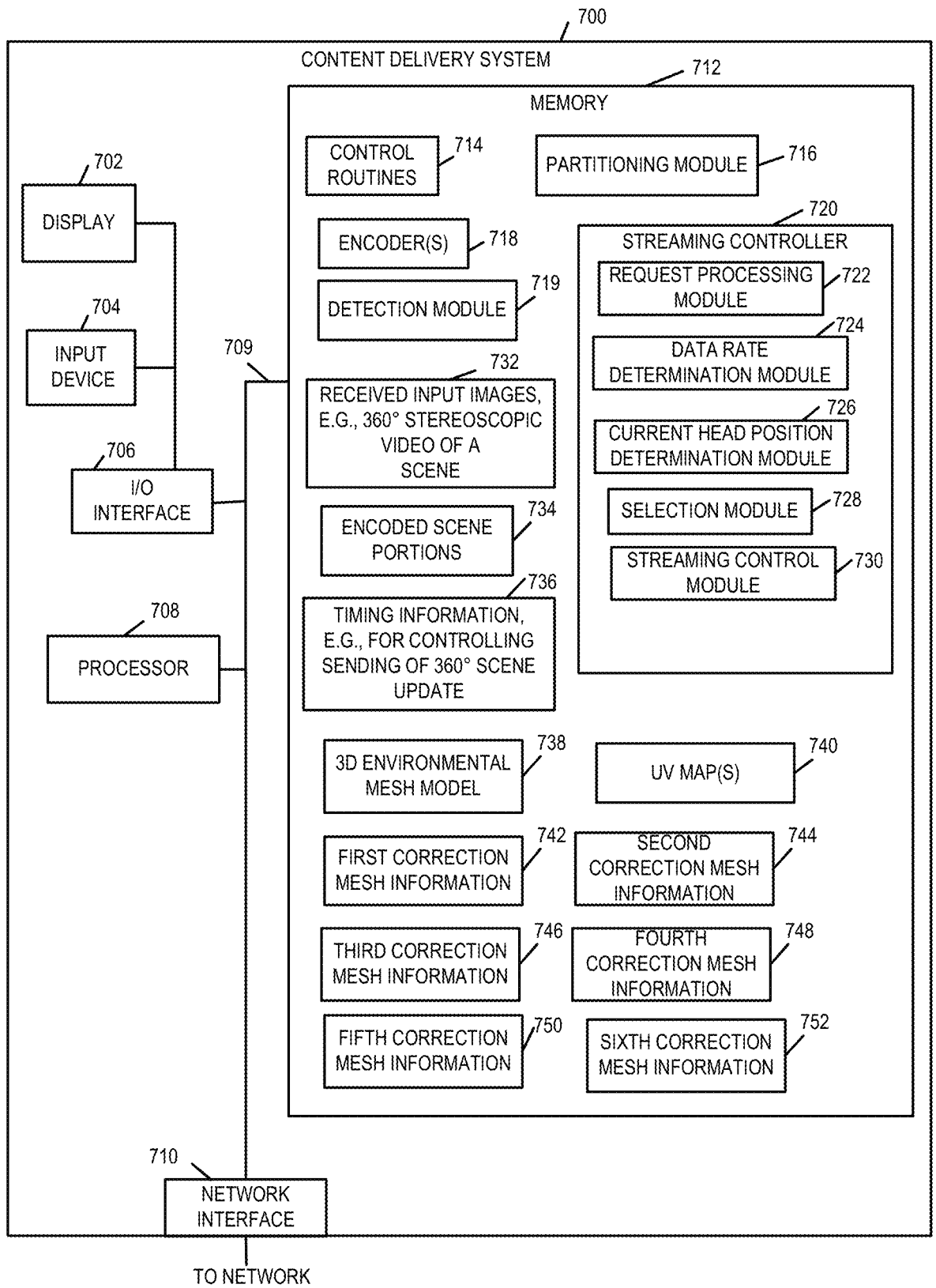
FIG. 2 illustrates an exemplary content delivery system with encoding capability that can be used to encode and stream content in accordance with the features of the invention.

FIG. 2 illustrates an exemplary content delivery system 700 with encoding capability that can be used to encode and stream content in accordance with the features of the invention.

Figure 3:
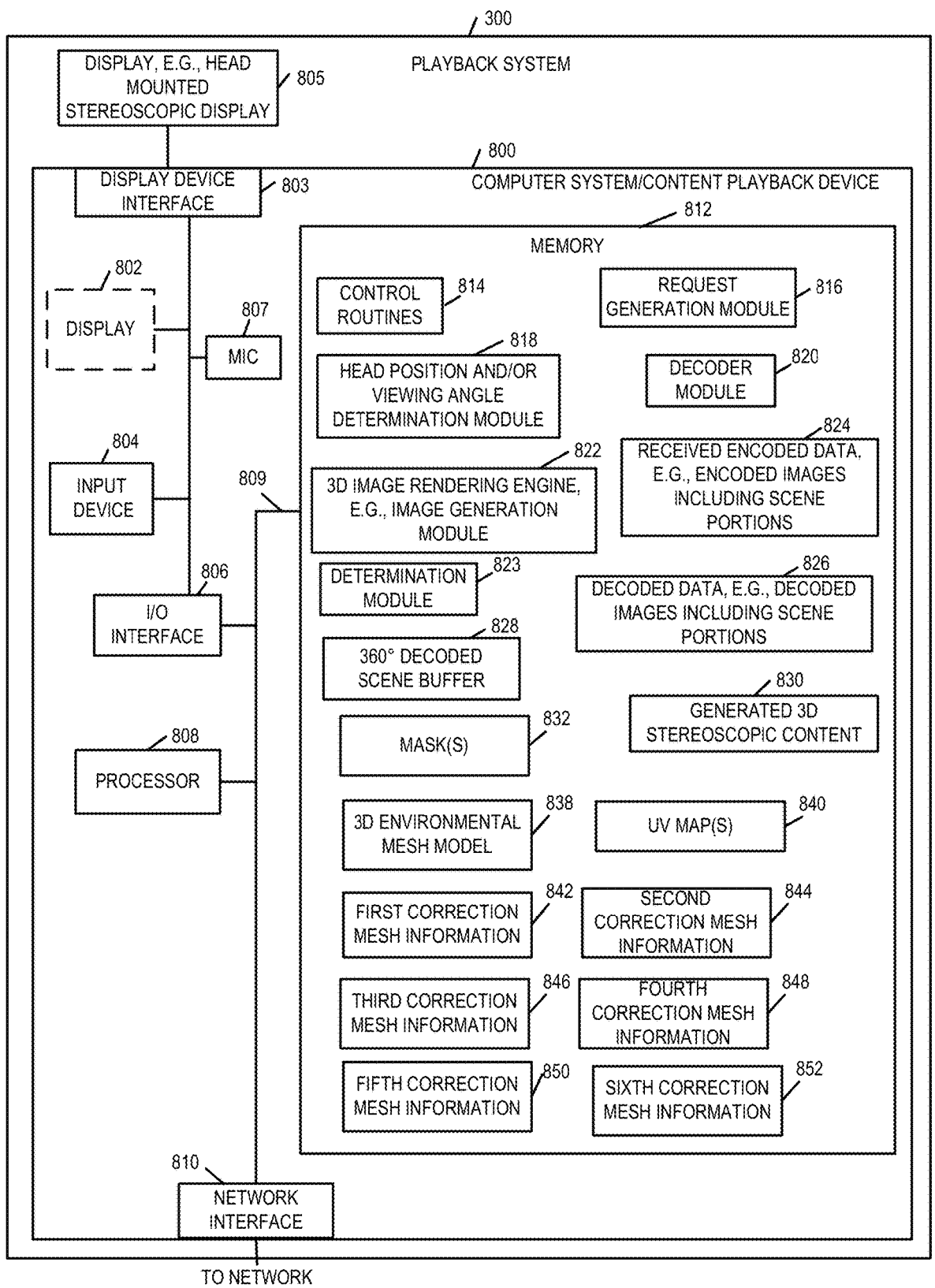
FIG. 3 illustrates an exemplary content playback system that can be used to receive, decode and display the content streamed by the system of FIG. 2.

The system may be used to perform object detection, encoding, storage, and transmission and/or content output in accordance with the features of the invention. The content delivery system 700 may be used as the system 104 of FIG. 1. While the system shown in FIG. 3 is used for encoding, processing and streaming of content, it should be appreciated that the system 700 may also include the ability to decode and display processed and/or encoded image data, e.g., to an operator.

The system 700 includes a display 702, input device 704, input/output (I/O) interface 706, a processor 708, network interface 710 and a memory 712. The various components of the system 700 are coupled together via bus 709 which allows for data to be communicated between the components of the system 700.

The memory 712 includes various modules, e.g., routines, which when executed by the processor 708 control the system 700 to implement the partitioning, encoding, storage, and streaming/transmission and/or output operations in accordance with the invention.

The memory 712 includes various modules, e.g., routines, which when executed by the processor 707 control the computer system 700 to implement the immersive stereoscopic video acquisition, encoding, storage, and transmission and/or output methods in accordance with the invention. The memory 712 includes control routines 714, a partitioning module 706, encoder(s) 718, a detection module 719, a streaming controller 720, received input images 732, e.g., 360 degree stereoscopic video of a scene, encoded scene portions 734, timing information 736, an environmental mesh model 738, UV maps(s) 740 and a plurality of correction mesh information sets including first correction mesh information 742, second correction mesh information 744, third correction mesh information 746, fourth correction mesh information 748, fifth correction mesh information 750 and sixth correction mesh information 752. In some embodiments the modules are, implemented as software modules. In other embodiments the modules are implemented in hardware, e.g., as individual circuits with each module being implemented as a circuit for performing the function to which the module corresponds. In still other embodiments the modules are implemented using a combination of software and hardware.

The control routines 714 include device control routines and communications routines to control the operation of the system 700. The partitioning module 716 is configured to partition a received stereoscopic 360-degree version of a scene into N scene portions in accordance with the features of the invention.

The encoder(s) 718 may, and in some embodiments do, include a plurality of encoders configured to encode received image content, e.g., 360-degree version of a scene and/or one or more scene portions in accordance with the features of the invention. In some embodiments encoder(s) include multiple encoders with each encoder being configured to encode a stereoscopic scene and/or partitioned scene portions to support a given bit rate stream. Thus in some embodiments each scene portion can be encoded using multiple encoders to support multiple different bit rate streams for each scene. An output of the encoder(s) 718 is the encoded scene portions 734 which are stored in the memory for streaming to customer devices, e.g., playback devices. The encoded content can be streamed to one or multiple different devices via the network interface 710.

The detection module 719 is configured to detect a network-controlled switch from streaming content from a current camera pair, e.g., first stereoscopic camera pair, to another camera pair, e.g., a second or third stereoscopic camera pair. That is the detection module 719 detects if the system 700 has switched from streaming content stream generated using images captured by a given stereoscopic camera pair, e.g., a first stereoscopic camera pair, to streaming content stream generated using images captured by another camera pair. In some embodiments the detection module is further configured to detect a user controlled change from receiving a first content stream including content from the first stereoscopic camera pair to receiving a second content stream including content from the second stereoscopic camera pair, e.g., detecting a signal from user playback device indicating that the playback device is attached to a different content stream than a content to which it was attached previously. The streaming controller 720 is configured to control streaming of encoded content for delivering the encoded image content to one or more customer devices, e.g., over the communications network 105.

The streaming controller 720 includes a request processing module 722, a data rate determination module 724, a current head position determination module 726, a selection module 728 and a streaming control module 730. The request processing module 722 is configured to process a received request for imaging content from a customer playback device. The request for content is received in various embodiments via a receiver in the network interface 710. In some embodiments the request for content includes information indicating the identity of requesting playback device. In some embodiments the request for content may include data rate supported by the customer playback device, a current head position of the user, e.g., position of the head mounted display. The request processing module 722 processes the received request and provides retrieved information to other elements of the streaming controller 720 to take further actions. While the request for content may include data rate information and current head position information, in various embodiments the data rate supported by the playback device can be determined from network tests and other network information exchange between the system 700 and the playback device.

The data rate determination module 724 is configured to determine the available data rates that can be used to stream imaging content to customer devices, e.g., since multiple encoded scene portions are supported the content delivery system 700 can support streaming content at multiple data rates to the customer device. The data rate determination module 724 is further configured to determine the data rate supported by a playback device requesting content from system 700. In some embodiments the data rate determination module 724 is configured to determine available data rate for delivery of image content based on network measurements.

The current head position determination module 726 is configured to determine a current viewing angle and/or a current head position of the user, e.g., position of the head mounted display, from information received from the playback device. In some embodiments the playback device periodically sends current head position information to the system 700 where the current head position determination module 726 receives ad processes the information to determine the current viewing angle and/or a current head position.

The selection module 728 is configured to determine which portions of a 360-degree scene to stream to a playback device based on the current viewing angle/head position information of the user. The selection module 728 is further configured to select the encoded versions of the determined scene portions based on available data rate to support streaming of content.

The streaming control module 730 is configured to control streaming of image content, e.g., multiple portions of a 360-degree stereoscopic scene, at various supported data rates in accordance with the features of the invention. In some embodiments the streaming control module 730 is configured to control stream N portions of a 360 degree stereoscopic scene to the playback device requesting content to initialize scene memory in the playback device. In various embodiments the streaming control module 730 is configured to send the selected encoded versions of the determined scene portions periodically, e.g., at a determined rate. In some embodiments the streaming control module 730 is further configured to send 360-degree scene update to the playback device in accordance with a time interval, e.g., once every minute. In some embodiments sending 360-degree scene update includes sending N scene portions or N–X scene portions of the full 360-degree stereoscopic scene, where N is the total number of portions into which the full 360-degree stereoscopic scene has been partitioned and X represents the selected scene portions recently sent to the playback device. In some embodiments the streaming control module 730 waits for a predetermined time after initially sending N scene portions for initialization before sending the 360-degree scene update. In some embodiments the timing information to control sending of the 360-degree scene update is included in the timing information 736. In some embodiments the streaming control module 730 is further configured identify scene portions which have not been transmitted to the playback device during a refresh interval; and transmit an updated version of the identified scene portions which were not transmitted to the playback device during the refresh interval.

In various embodiments the streaming control module 730 is configured to communicate at least a sufficient number of the N portions to the playback device on a periodic basis to allow the playback device to fully refresh a 360-degree version of said scene at least once during each refresh period.

Figure 4:
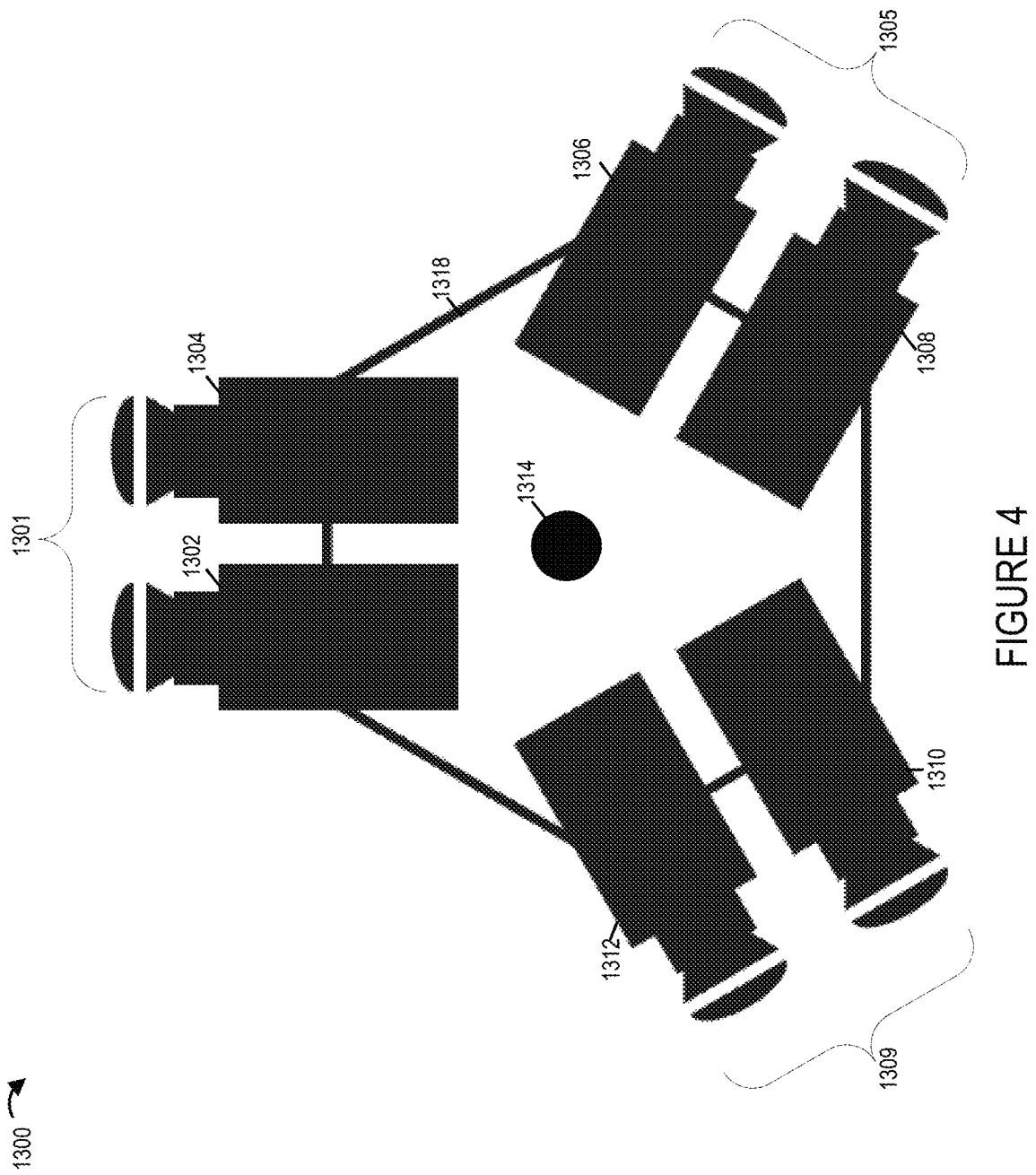
FIG. 4 illustrates a camera rig including multiple camera pairs for capturing left and right eye images corresponding to different 120-degree sectors of a 360-degree field of view along with a camera or cameras directed towards the sky to capture a sky view.

In some embodiments streaming controller 720 is configured to control the system 700 to transmit, e.g., via a transmitter in the network interface 710, a stereoscopic content stream (e.g., encoded content stream 734) including encoded images generated from image content captured by one or more cameras, e.g., cameras of stereoscopic camera pairs such as illustrated in FIG. 4. In some embodiments streaming controller 720 is configured to control the system 700 to transmit, to one or more playback devices, an environmental mesh model 738 to be used in rendering image content. In some embodiments streaming controller 720 is further configured to transmit to a playback device a first UV map to be used for mapping portions of images captured by a first stereoscopic camera pair to a portion of the environmental mesh model as part of a image rendering operation.

In various embodiments the streaming controller 720 is further configured to provide (e.g., transmit via a transmitter in the network interface 710) one or more sets of correction mesh information, e.g., first, second, third, fourth, fifth, sixth, correction mesh information to a playback device. In some embodiments the first correction mesh information is for use in rendering image content captured by a first camera of a first stereoscopic camera pair, the second correction mesh information is for use in rendering image content captured by a second camera of the first stereoscopic camera pair, the third correction mesh information is for use in rendering image content captured by a first camera of a second stereoscopic camera pair, the fourth correction mesh information is for use in rendering image content captured by a second camera of the second stereoscopic camera pair, the fifth correction mesh information is for use in rendering image content captured by a first camera of a third stereoscopic camera pair, the sixth correction mesh information is for use in rendering image content captured by a second camera of the third stereoscopic camera pair. In some embodiments the streaming controller 720 is further configured to indicate, e.g., by sending a control signal, to the playback device that the third and fourth correction mesh information should be used when content captured by the second stereoscopic camera pair is streamed to the playback device instead of content from the first stereoscopic camera pair. In some embodiments the streaming controller 720 is further configured to indicate to the playback device that the third and fourth correction mesh information should be used in response to the detection module 719 detecting i) a network controlled switch from streaming content from said first stereoscopic camera pair to said second stereoscopic pair or ii) a user controlled change from receiving a first content stream including content from said first stereoscopic camera pair to receiving a second content stream including encoded content from the second stereoscopic camera pair.

The memory 712 further includes the environmental mesh model 738, UV map(s) 740, and sets of correction mesh information including first correction mesh information 742, second correction mesh information 744, third correction mesh information 746, fourth correction mesh information 748, fifth correction mesh information 750 and sixth correction mesh information 752. The system provides the environmental mesh model 738 to one or more playback devices for use in rendering image content. The UV map(s) 740 include at least a first UV map to be used for mapping portions of images captured by the first stereoscopic camera pair to a portion of the environmental mesh model 738 as part of a image rendering operation. The first correction mesh information 742 includes information generated based on measurement of one or more optical characteristics of a first lens of said first camera of the first stereoscopic camera pair and the second correction mesh includes information generated based on measurement of one or more optical characteristic of a second lens of said second camera of the first stereoscopic camera pair. In some embodiments the first and second stereoscopic camera pairs correspond to a forward viewing direction but different locations at an area or event location where content is being captured for streaming.

In some embodiments the processor 708 is configured to perform the various functions corresponding to the steps discussed in flowcharts 600 and/or 2300. In some embodiments the processor uses routines and information stored in memory to perform various functions and control the system 700 to operate in accordance with the methods of the present invention. In one embodiments the processor 708 is configured to control the system to provide the first correction mesh information and the second correction mesh information to a playback device, the first correction mesh information being for use in rendering image content captured by the first camera, the second correction mesh information being for use in rendering image content captured by the second camera. In some embodiments the first stereoscopic camera pair corresponds to a first direction and the processor is further configured to control the system 700 to transmit a stereoscopic content stream including encoded images generated from image content captured by the first and second cameras. In some embodiments the processor 708 is further configured to transmit to the playback device an environmental mesh model to be used in rendering image content. In some embodiments the processor 708 is further configured to transmit to the playback device a first UV map to be used for mapping portions of images captured by the first stereoscopic camera pair to a portion of the environmental mesh model as part of a image rendering operation. In some embodiments the processor 708 is further configured to control the system 700 to provide third correction mesh information and fourth correction mesh information to the playback device, the third correction mesh information being for use in rendering image content captured by a first camera of a second stereoscopic camera pair, the fourth correction mesh information being for use in rendering image content captured by a second camera of the second stereoscopic camera pair. In some embodiments the processor 708 is further configured to control the system 700 to indicate (e.g., transmit via network interface 710) to the playback device that the third and fourth correction mesh information should be used when content captured by the second camera pair is streamed to the playback device instead of content from the first camera pair. In some embodiments the processor 708 is further configured to control the system 700 to indicate to the playback device that the third and fourth correction mesh information should be used in response to the system detecting: i) a network controlled switch from streaming content from the first stereoscopic camera pair to the second stereoscopic pair or ii) a user controlled change from receiving a first content stream including content from the first stereoscopic camera pair to receiving a second content stream including encoded content from the second stereoscopic camera pair. In some embodiments the processor 708 is further configured to control the system 700 to system to provide the fifth and sixth correction mesh information to the playback device, the fifth correction mesh information being for use in rendering image content captured by the first camera of the third stereoscopic camera pair, the sixth correction mesh information being for use in rendering image content captured by the second camera of the third stereoscopic camera pair.

FIG. 3 illustrates a playback system 300 implemented in accordance with an exemplary embodiment of the present invention. Playback system 300 is, e.g., playback system 101 or playback system 111 of FIG. 1. The system 300 can and sometimes does implement the method shown in FIG. 9. Exemplary playback system 300 includes computer system/playback device 800 coupled to display 805, e.g., a head mounted stereoscopic display. Computer system/playback device 800 implemented in accordance with the present invention can be used to receive, decode, store and display imaging content received from a content delivery system such as the one shown in FIGS. 1 and 2. The playback device may be used with a 3D head mounted display such as the OCULUS RIFT™ VR (virtual reality) headset which may be the head mounted display 805. The device 800 includes the ability to decode the received encoded image data and generate 3D image content for display to the customer. The playback device in some embodiments is located at a customer premise location such as a home or office but may be located at an image capture site as well. The device 800 can perform signal reception, decoding, display and/or other operations in accordance with the invention.

The device 800 includes a display 802, a display device interface 803, input device 804, microphone (mic) 807, input/output (I/O) interface 806, a processor 808, network interface 810 and a memory 812. The various components of the playback device 800 are coupled together via bus 809 which allows for data to be communicated between the components of the system 800. While in some embodiments display 802 is included as an optional element as illustrated using the dashed box, in some embodiments an external display device 805, e.g., a head mounted stereoscopic display device, can be coupled to the playback device via the display device interface 803.

Via the I/O interface 806, the system 800 can be coupled to external devices to exchange signals and/or information with other devices. In some embodiments via the I/O interface 806 the system 800 can receive information and/or images from an external device and output information and/or images to external devices. In some embodiments via the interface 806 the system 800 can be coupled to an external controller, e.g., such as a handheld controller.

The processor 808, e.g., a CPU, executes routines 814 and modules in memory 812 and uses the stored information to control the system 800 to operate in accordance with the invention. The processor 808 is responsible for controlling the overall general operation of the system 800. In various embodiments the processor 808 is configured to perform functions that have been discussed as being performed by the playback system 800.

Via the network interface 810 the system 800 communicates and/or receives signals and/or information (e.g., including encoded images and/or video content corresponding to a scene) to/from various external devices over a communications network, e.g., such as communications network 105. In some embodiments the system receives one or more content streams including encoded images captured by one or more different cameras via the network interface 810 from the content delivery system 700. The received content stream may be stored as received encoded data, e.g., encoded images 824. In some embodiments the interface 810 is configured to receive a first encoded image including image content captured by a first camera and a second encoded image corresponding to a second camera. The network interface 810 includes a receiver and a transmitter via which the receiving and transmitting operations are performed. In some embodiments the interface 810 is configured to receive correction mesh information corresponding to a plurality of different cameras including first correction mesh information 842, second correction mesh information 844, third correction mesh information 846, fourth correction mesh information 848, fifth correction mesh information 850 and sixth correction mesh information 852 which are then stored in memory 812. Furthermore in some embodiments via the interface 810 the system receives one or more mask(s) 832, an environmental mesh model 838, UV maps(s) 840 which are then stored in memory 812.

The memory 812 includes various modules, e.g., routines, which when executed by the processor 808 control the playback device 800 to decoding and output operations in accordance with the invention. The memory 812 includes control routines 814, a request for content generation module 816, a head position and/or viewing angle determination module 818, a decoder module 820, a stereoscopic image rendering engine 822 also referred to as a 3D image generation module, a determination module, and data/information including received encoded image content 824, decoded image content 826, a 360-degree decoded scene buffer 828, generated stereoscopic content 830, mask(s) 832, an environmental mesh model 838, UV maps(s) 840 and a plurality of received correction mesh information sets including first correction mesh information 842, second correction mesh information 844, third correction mesh information 846, fourth correction mesh information 848, fifth correction mesh information 850 and sixth correction mesh information 852.

The control routines 814 include device control routines and communications routines to control the operation of the device 800. The request generation module 816 is configured to generate a request for content to send to a content delivery system for providing content. The request for content is sent in various embodiments via the network interface 810. The head position and/or viewing angle determination module 818 is configured to determine a current viewing angle and/or a current head position of the user, e.g., position of the head mounted display, and report the determined position and/or viewing angle information to the content delivery system 700. In some embodiments the playback device 800 periodically sends current head position information to the system 700.

The decoder module 820 is configured to decode encoded image content 824 received from the content delivery system 700 to produce decoded image data, e.g., decoded images 826. The decoded image data 826 may include decoded stereoscopic scene and/or decoded scene portions. In some embodiments the decoder 820 is configured to decode the first encoded image to generate a first decoded image and decode the second received encoded image to generate a second decoded image. The decoded first and second images are included in the stored decoded image images 826.

The 3D image rendering engine 822 performs the rendering operations (e.g., using content and information received and/or stored in memory 812 such as decoded images 826, environmental mesh model 838, UV map(s) 840, masks 832 and mesh correction information) and generates 3D image in accordance with the features of the invention for display to the user on the display 802 and/or the display device 805. The generated stereoscopic image content 830 is the output of the 3D image generation engine 822. In various embodiments the rendering engine 822 is configured to perform a first rendering operation using the first correction information 842, the first decoded image and the environmental mesh model 838 to generate a first image for display. In various embodiments the rendering engine 822 is further configured to perform a second rendering operation using the second correction information 844, the second decoded image and the environmental mesh model 838 to generate a second image for display. In some such embodiments the rendering engine 822 is further configured to use a first UV map (included in received UV map(s) 840) to perform the first and second rendering operations. The first correction information provides information on corrections to be made to node positions in the first UV map when the first rendering operation is performed to compensate for distortions introduced into the first image by a lens of the first camera and the second correction information provides information on corrections to be made to node positions in the first UV map when the second rendering operation is performed to compensate for distortions introduced into the second image by a lens of the second camera. In some embodiments the rendering engine 822 is further configured to use a first mask (included in mask(s) 832) to determine how portions of the first image are combined with portions of a first image corresponding to a different field of view as part of the first rendering operation when applying portions of the first image to a surface of the environmental mesh model as part of the first rendering operation. In some embodiments the rendering engine 822 is further configured to use the first mask to determine how portions of the second image are combined with a portions of a second image corresponding to the different field of view as part of the second rendering operation when applying portions of the second image to the surface of the environmental mesh model as part of the second rendering operation. The generated stereoscopic image content 830 includes the first and second images (e.g., corresponding to left and right eye views) generated as a result of the first and second rendering operation. In some embodiments the portions of a first image corresponding to a different field of view correspond to a sky or ground field of view. In some embodiments the first image is a left eye image corresponding to a forward field of view and the first image corresponding to a different field of view is a left eye image captured by a third camera corresponding to a side field of view adjacent the forward field of view. In some embodiments the second image is a right eye image corresponding to a forward field of view and wherein the second image corresponding to a different field of view is a right eye image captured by a fourth camera corresponding to a side field of view adjacent the forward field of view. Thus the rendering engine 822 renders the 3D image content 830 to the display. In some embodiments the operator of the playback device 800 may control one or more parameters via input device 804 and/or select operations to be performed, e.g., select to display 3D scene.

The network interface 810 allows the playback device to receive content from the streaming device 114 and/or communicate information such as view head position and/or position (camera rig) selection indicating selection of particular viewing position at an event. In some embodiments the decoder 820 is implemented as a module. In such embodiments when executed the decoder module 820 causes received images to be decoded while 3D image rendering engine 822 causes further processing of the images in accordance with the present invention and optionally stitching of images together as part of the presentation process.

In some embodiments the interface 810 is further configured to receive additional mesh correction information corresponding to a plurality of different cameras, e.g., third, fourth, fifth and sixth mesh correction information. In some embodiments the rendering engine 822 is further configured to use mesh correction information corresponding to a fourth camera (e.g., fourth mesh correction information 848) when rendering an image corresponding to a fourth camera, the fourth camera being one of the plurality of different cameras. The determination module 823 is configured to determine which mesh correction information is to be used by the rendering engine 822 when performing a rendering operation based on which camera captured image content is being used in the rendering operation or based an indication from a server indicating which mesh correction information should be used when rendering images corresponding to a received content stream. The determination module 823 may be implemented as part of the rendering engine 822 in some embodiments.

In some embodiments the modules and/or elements shown in the memory 712 of FIG. 2 and memory 812 of FIG. 3 are implemented as software modules. In other embodiments the modules and/or elements, while shown to be included in the memory, are implemented in hardware, e.g., as individual circuits with each element being implemented as a circuit for performing the function corresponding to the element. In still other embodiments the modules and/or elements are implemented using a combination of software and hardware.

While shown in FIGS. 2 and 3 to be included in the memory, the elements shown included in the system 700 and 800 can, and in some embodiments are, implemented fully in hardware within the processor, e.g., as individual circuits, of the corresponding device, e.g., within the processor 708 in case of the content delivery system and within the processor 808 in the case of playback system 800. In other embodiments some of the elements are implemented, e.g., as circuits, within the corresponding processors 708 and 808 with other elements being implemented, e.g., as circuits, external to and coupled to the processors. As should be appreciated the level of integration of modules on the processor and/or with some modules being external to the processor may be one of design choice. Alternatively, rather than being implemented as circuits, all or some of the elements may be implemented in software and stored in the memory, with the software modules controlling operation of the respective systems 700 and 800 to implement the functions corresponding to the modules when the modules are executed by their respective processors, e.g., processors 708 and 808. In still other embodiments, various elements are implemented as a combination of hardware and software, e.g., with a circuit external to the processor providing input to the processor which then under software control operates to perform a portion of a module's function.

Figure 7:
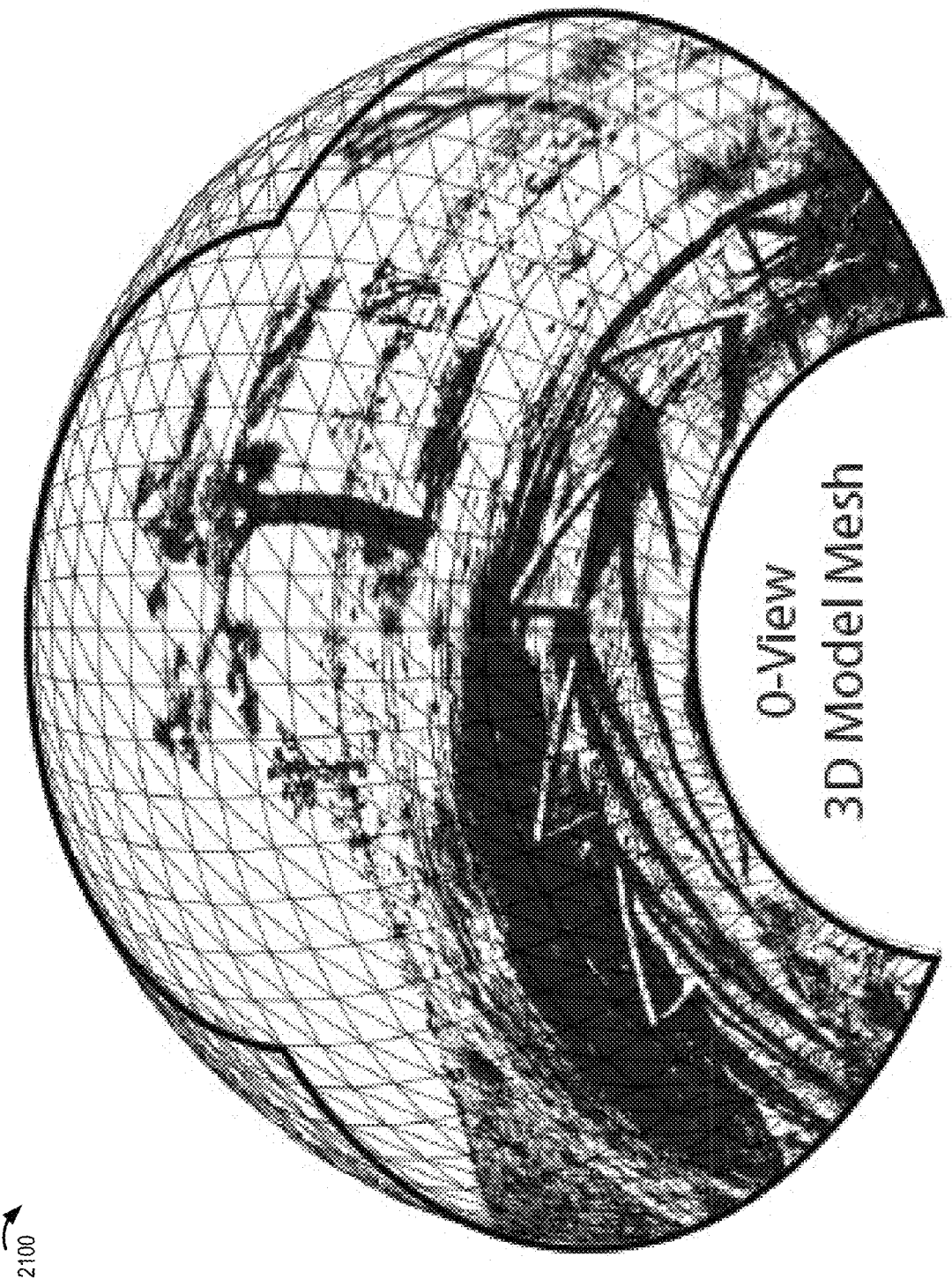
FIG. 7 shows an environmental mesh model corresponding to one sector of the camera rig with one of the images applied, e.g., projected, onto the environmental mesh.
Figure 8:
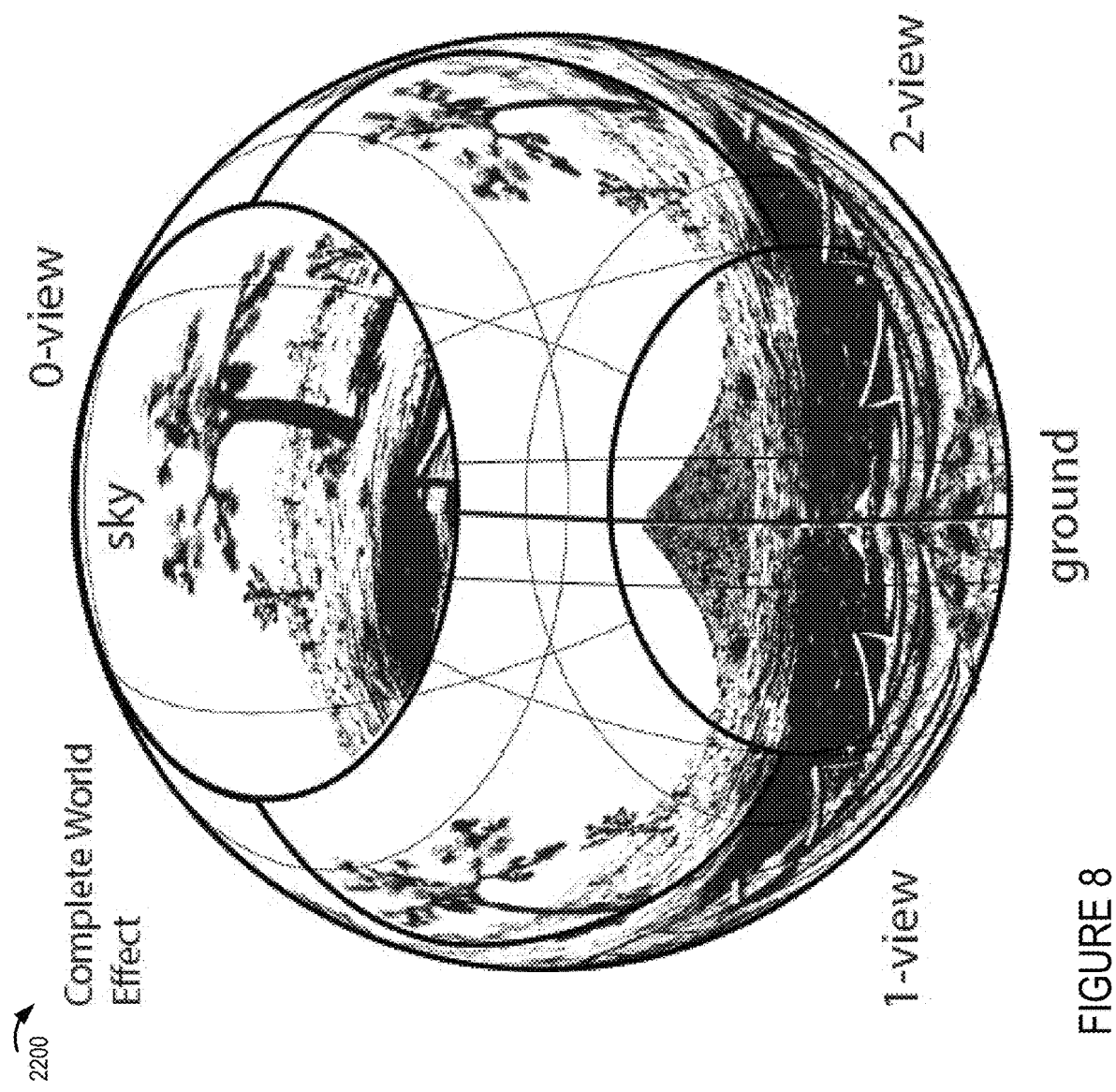
FIG. 8 shows application of images captured by cameras corresponding each of the sectors as well as the sky and ground cameras of the camera rig to simulate a complete 3D environment in the form of a sphere.

While shown in each of FIGS. 2 and 3 embodiments as a single processor, e.g., computer, it should be appreciated that each of the processors 708 and 808 may be implemented as one or more processors, e.g., computers. When one or more elements in the memory 712 and 812 are implemented as software modules, the modules include code, which when executed by the processor of the corresponding system (e.g., processor 708 and 808) configure the processor to implement the function corresponding to the module. In embodiments where the various modules shown in FIGS. 7 and 8 are stored in memory, the memory is a computer program product comprising a computer readable medium comprising code, e.g., individual code for each module, for causing at least one computer, e.g., processor, to implement the functions to which the modules correspond.

Completely hardware-based or completely software-based modules may be used. However, it should be appreciated that any combination of software and hardware, e.g., circuit implemented modules may be used to implement the functions. As should be appreciated, the modules illustrated in FIG. 2 control and/or configure the system 700 or elements therein such as the processor 708, to perform the functions of corresponding steps of the methods of the present invention, e.g., such as those illustrated and/or described in the flowcharts. Similarly the modules illustrated in FIG. 3 control and/or configure the system 800 or elements therein such as the processor 808, to perform the functions of corresponding steps of the methods of the present invention, e.g., such as those illustrated and/or described in a flowchart.

To facilitate an understanding of the image capture process reference will now be made to the exemplary camera rig shown in FIG. 4. The camera rig 1300 can be used as the rig 102 of the FIG. 1 system and includes a plurality of stereoscopic camera pairs each corresponding to a different one of three sectors. The first stereoscopic camera pair 1301 includes a left eye camera 1302 (e.g., first camera) and a right camera 1304 (e.g., second camera) intended to capture images corresponding to those which would be seen by a left and right eye of a person positioned at the location of the first camera pair. Second stereoscopic camera pair 1305 corresponds to a second sector and includes left and right cameras 1306, 1308 while the third stereoscopic camera pair 1309 corresponds to a third sector includes left and right cameras 1310, 1312. Each camera is mounted in a fixed position in the support structure 1318. An upward facing camera 1314 is also included. A downward facing camera which is not visible in FIG. 4 may be included below camera 1314. Stereoscopic camera pairs are used in some embodiments to capture pairs of upward and downward images however in other embodiments a single upward camera and a single downward camera are used. In still other embodiments a downward image is captured prior to rig placement and used as a still ground image for the duration of an event. Such an approach tends to be satisfactory for many applications given that the ground view tends not to change significantly during an event. The output of the cameras of the rig 1300 are captured and processed.

Figure 5:
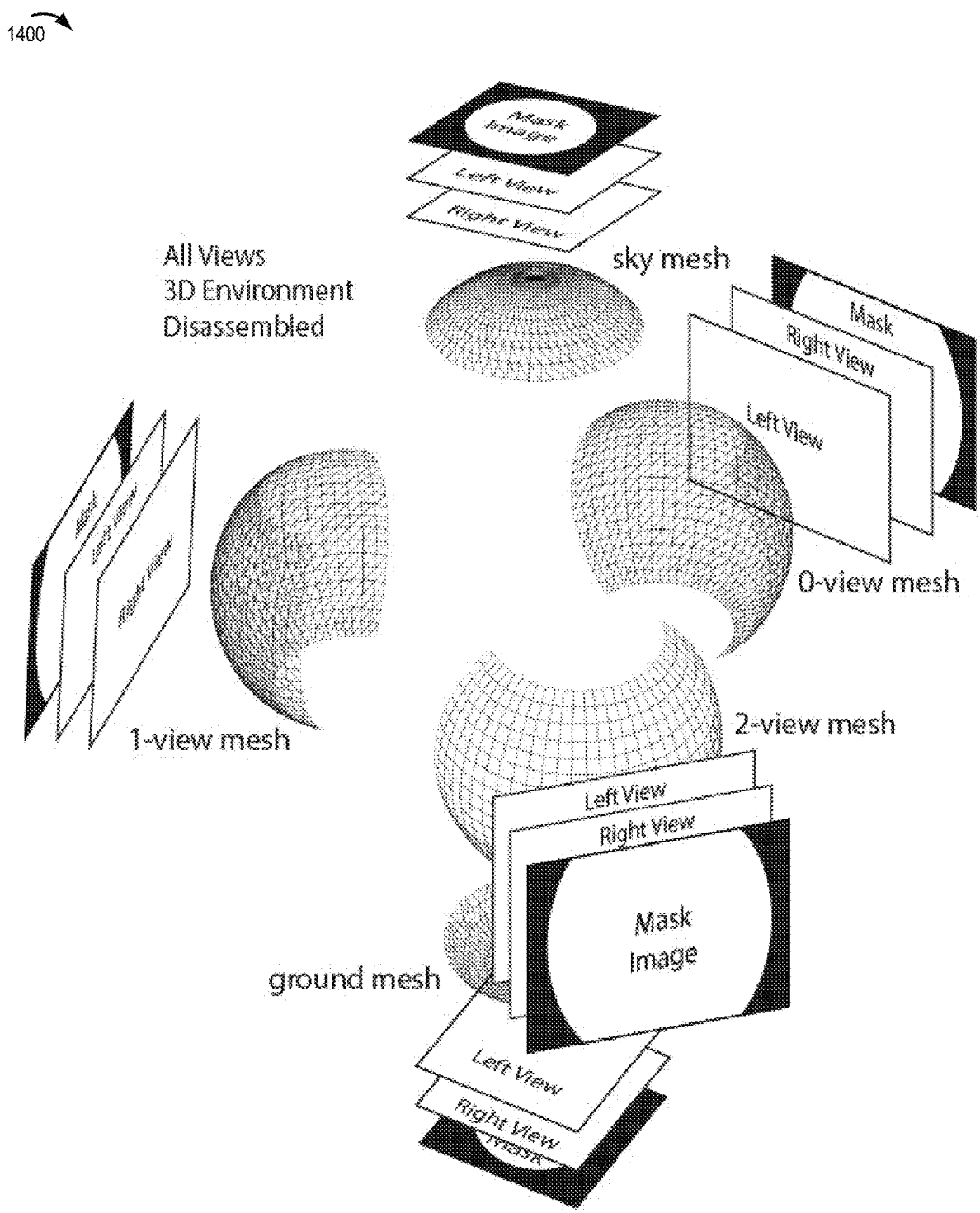
FIG. 5 shows how five different environmental mesh maps, corresponding to different camera views, can be combined to create a complete spherical view/environment onto which captured images can be projected as part of a playback operation.

When the FIG. 4 camera rig is used each of the sectors corresponds to a known 120-degree viewing area with respect to the camera rig position, with the captured images from different sector pairs being seamed together based on the images known mapping to the simulated 3D environment. While a 120-degree portion of each image captured by a sector camera is normally used, the cameras capture a wider image corresponding to approximately a 180-degree viewing area. Accordingly, captured images may be subject to masking in the playback device as part of the 3D environmental simulation. FIG. 5 is a composite diagram 1400 showing how a 3D spherical environment can be simulated using environmental mesh portions which correspond to different camera pairs of the rig 102. Note that one mesh portion is shown for each of the sectors of the rig 102 with a sky mesh being used with regard to the top camera view and the ground mesh being used for the ground image captured by the downward facing camera. While the masks for the top and bottom images are round in nature, the masks applied to the sector images are truncated to reflect that top and bottom portions of the scene area will be supplied by the top and bottom cameras respectively.

Figure 6:
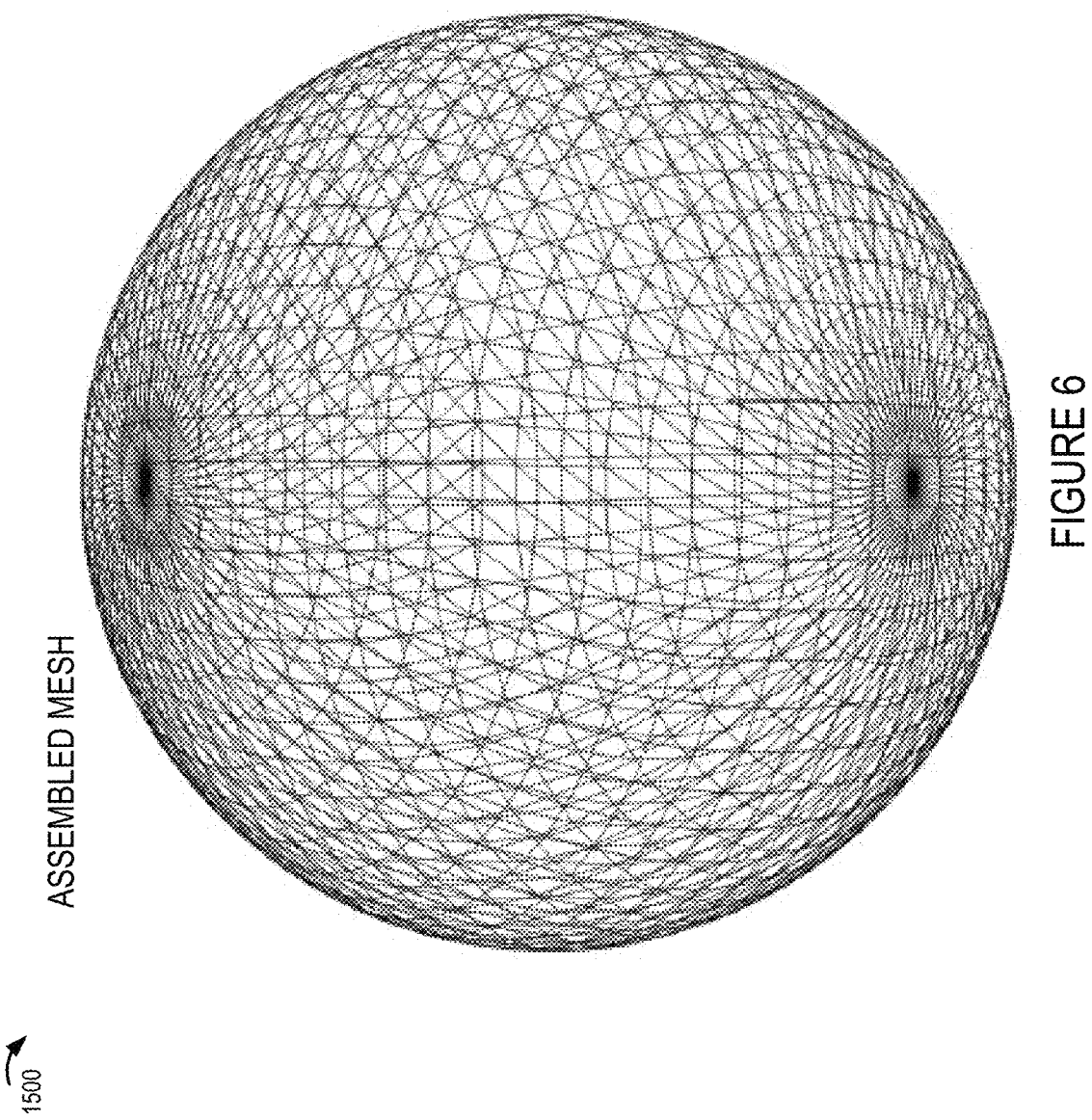
FIG. 6 shows the full assembly of five meshes to create a spherical simulated environment

When combined the overall meshes corresponding to different cameras results in a spherical mesh as shown in FIG. 6. Note that the mesh is shown for a single eye image but that it is used for both the left and right eye images in the case of stereoscopic image pairs being captured.

Mesh and masking information of the type shown in FIG. 5 can and sometimes is communicated to the playback device. The communicated information will vary depending on the rig configuration. For example if a larger number of sectors were used masks corresponding to each of the sectors would correspond to a small viewing area than 120 degrees with more than 3 environmental grids being required to cover the diameter of the sphere.

Environmental map information is shown being optionally transmitted in step 1132 to the playback device. It should be appreciated that the environmental map information is optional in that the environment may be assumed to be a default size sphere in the event such information is not communicated. In cases where multiple different default size spheres are supported an indication as to what size sphere is to be used maybe and sometimes is communicated to the playback device.

Image capture operations may be performed on an ongoing basis during an event particularly with regard to each of the three sectors which can be captured by the camera rig 102.

Note that while multiple camera views are captured corresponding to different sectors the image capture rate need not be the same for all sectors. For example, a front facing sector corresponding to e.g., the main playing field may capture images at a fast frame rate that the cameras corresponding to other sectors and/or the top (sky) and bottom (ground) views.

FIG. 7 illustrates mapping of an image portion corresponding to a first sector to the corresponding 120-degree portion of the sphere representing the 3D viewing environment.

Images corresponding to different portions of the 360-degree environment are combined the extent needed to provide a contiguous viewing area to the viewer, e.g., depending on head position. For example, if the viewer is looking at the intersection of two 120-degree sectors portions of the image corresponding to each sector will be seamed and presented together to the viewer based on the know angle and position of each image in the overall 3D environment being simulated. The seaming and generation of an image will be performed for each of the left and right eye views so that two separate images are generated, one per eye, in the case of a stereoscopic implementation.

FIG. 8 shows how multiple decoded, corrected, and cropped images can be, and sometime are, mapped and seemed together to create a 360-degree viewing environment.

The mapped images are output to a display device for viewing by a user. As should be appreciated the images which are displayed will change over time based on the received images and/or because of changes in head position or the user selected viewer position with, in the case of stereoscopic images, separate left and right eye images being generated for separate display to a users left and right eyes, respectively.

Figure 9B:
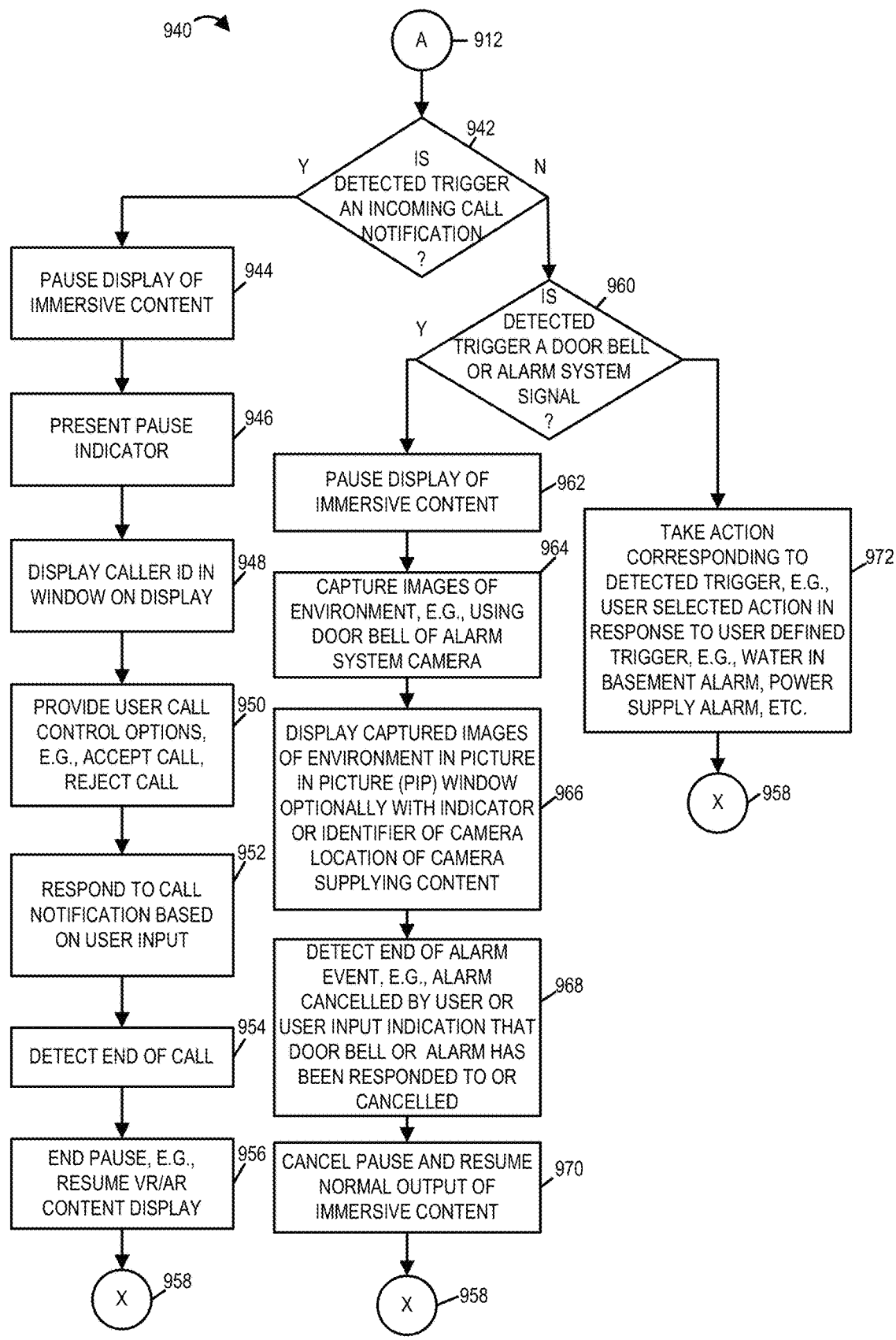
FIG. 9B is a second part of an exemplary flow chart showing the steps of a method implemented in accordance with one exemplary embodiment.
Figure 9C:
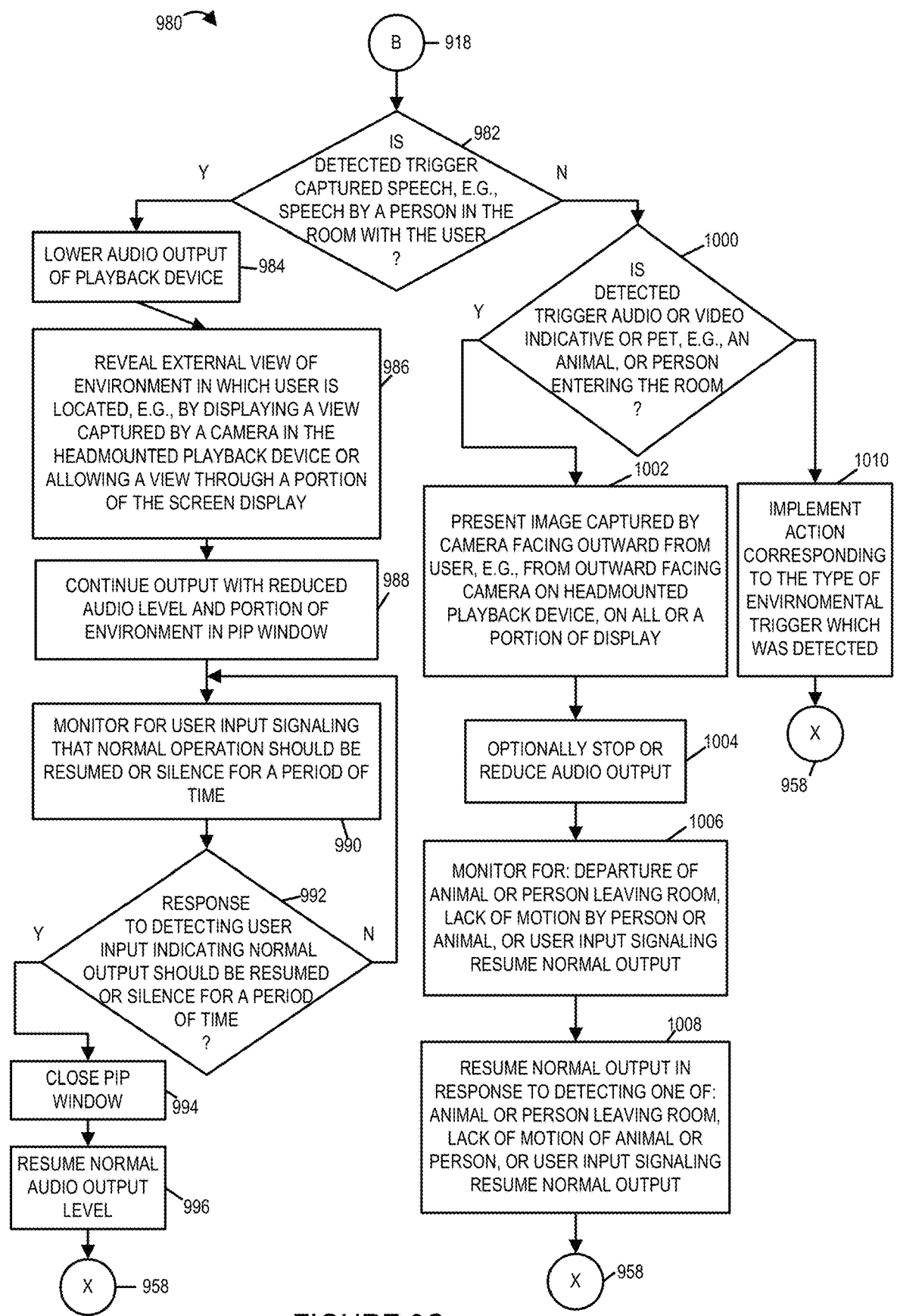
FIG. 9C is a third part of an exemplary flow chart showing the steps of a method implemented in accordance with one exemplary embodiment.
Figure 9D:
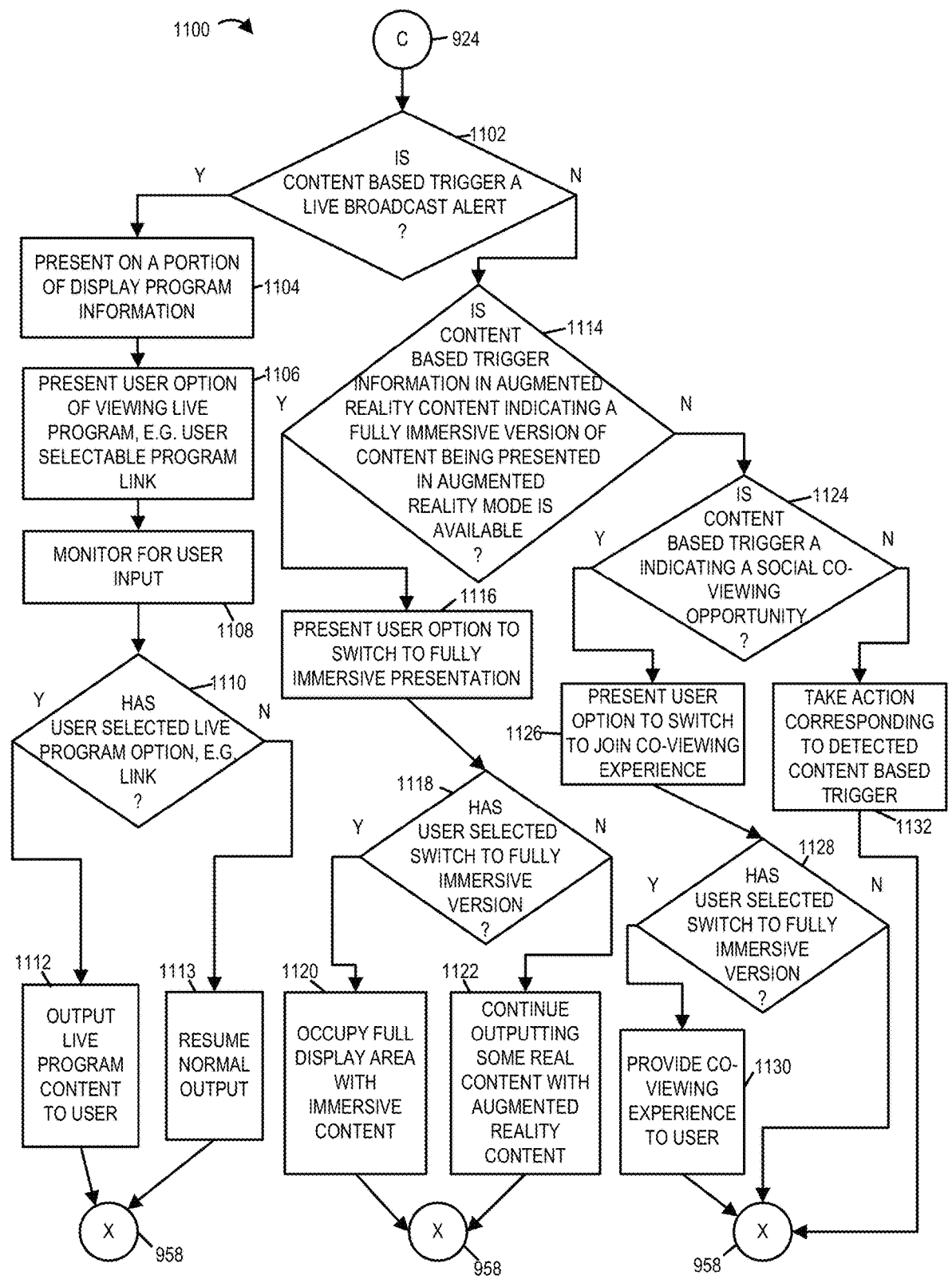
FIG. 9D is a fourth part of an exemplary flow chart showing the steps of a method implemented in accordance with one exemplary embodiment.
Figure 9E:
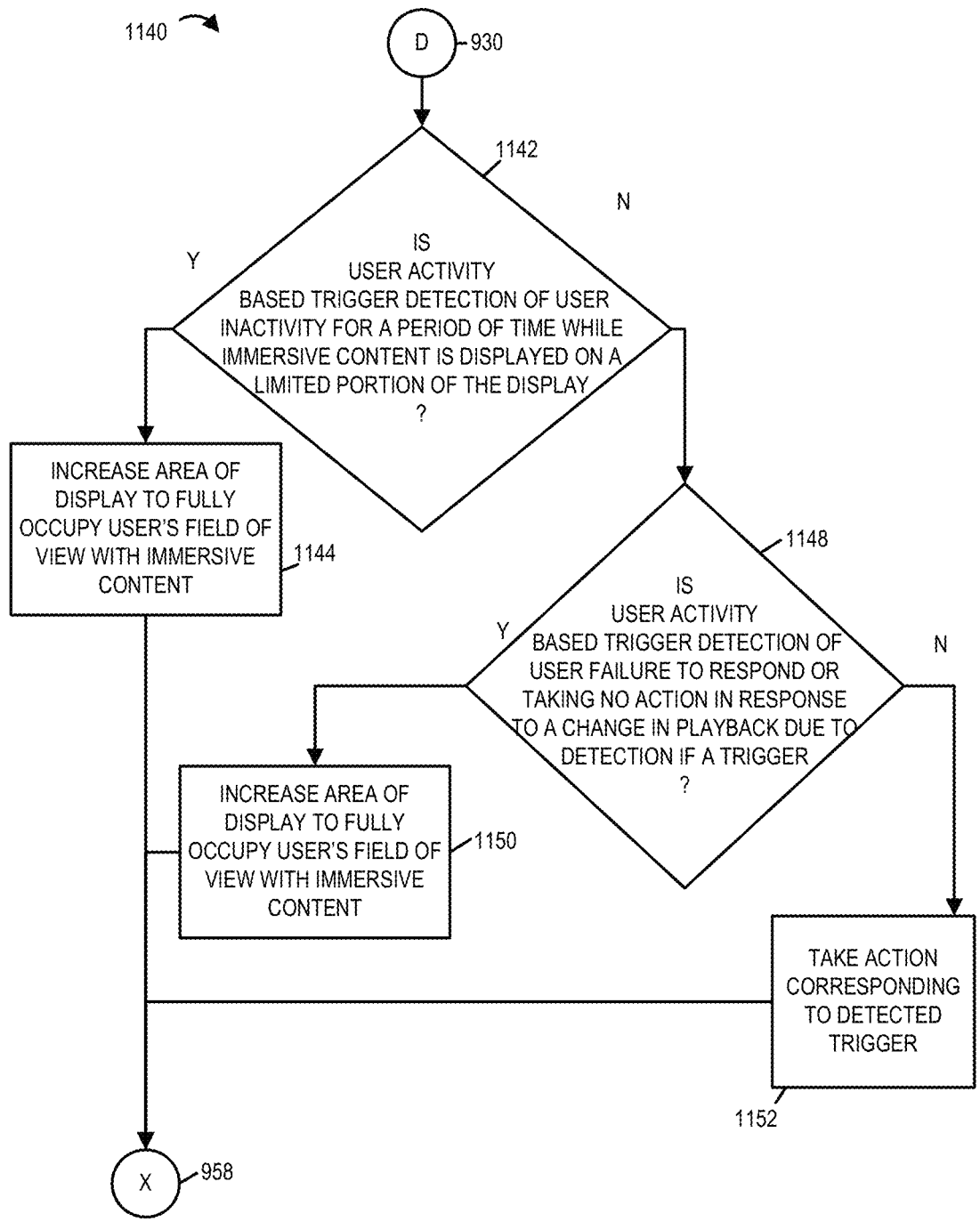
FIG. 9E is a first part of an exemplary flow chart showing the steps of a method implemented in accordance with one exemplary embodiment.

FIG. 9 is a diagram 900 which comprises the combination of FIGS. 9A, 9B, 9C, 9D and 9E which in combination show the steps of a method operating a playback device involving detecting a trigger and then responding to the trigger by modifying playback. The playback device of FIG. 3 may and sometimes does implement the method shown in FIG. 9 under control of the processor included in the playback device. FIG. 9A shows the first part 902 of the method 900. Figure B shows the second part 940 of the method 900. FIG. 9C shows the third part 980 of the method 900. FIG. 9D shows the fourth part 1100 of the method 900 and FIG. 9E shows the fifth part 1140 of the method 900. In the method 900 device playback may be modified in response to a trigger, e.g., an environmental trigger. Modifying playback includes, in some cases, making a change in the presentation of content to a user of the playback system in one or more ways such as providing a PIP window, altering audio output and/or displaying a portion of the environment external to the user on the display rather than simply content being played back.

The detected trigger may include one of a variety of different possible triggers and the action taken in response to the trigger, e.g., the modification of playback operation can vary depending on the type of trigger which is detected. FIG. 9 comprises the combination of FIGS. 9A to 9E with portions of FIGS. 9B-9E showing actions which may be taken in response to a detected trigger.

The method 900 starts in step 904 which is shown in FIG. 9A with the playback device, e.g., device 300 of FIG. 3, operating as a virtual reality or augmented reality device, e.g., outputting content to a user wearing a head mounted display as part of presentation of content to a user of the playback system. Accordingly, start step 904 includes presenting content to a user. With content being presented to a user as part of an AR or VR presentation, operation proceeds from step 904 to monitoring step 903 which includes one, more or all of steps 906, 914, 920, 926 which are performed in parallel and sometimes on an ongoing basis in some embodiments. Each of the steps 906, 914, 920 and 926 involving monitoring for a different type of trigger that may trigger one or more actions to be taken by the playback device with regard to the ongoing presentation.

As monitoring is performed, checks are made to determine if a trigger was detected. Step 905 includes detecting a trigger by determining in one of steps 908, 916, 922 or 928 that a trigger event was detected as a result of the monitoring. In response to a trigger being detected in step 907, operation proceeds to step 909 in which an action is taken in respond to the trigger that was detected. The action may involve responding to the detected trigger by call or going to the steps of one of the subroutines shown in FIG. 9B, 9C, 9D or 9E depending on which trigger was detected. Which substeps of steps 903, 907, 909 are preformed depend on which, if any, trigger is detected.

In step 906 the playback device monitors for a trigger from an external system, e.g., from a phone system, doorbell system or some other system which can provide a signal or information to the playback device. In step 908 a check is made as to whether a trigger from an external system was detected. If a trigger from an external system was detected operation proceeds from step 908 to step 941 of FIG. 9B via connecting node A 912. However, if no triggers were detected in step 908 operation returns from step 908 to step 906. It should be appreciated that while the processing initiated due to the detection of a trigger proceeds the monitoring in step 906 and check 908 may still be performed on an ongoing or periodic basis in an attempt to detect and initiate processing with regard to one or more additional triggers.

In step 914 the playback device monitors for an environmental trigger, e.g., an audio or visual trigger using a microphone and/or camera included in the playback system, e.g., on a head mounted device which may be part of the system implementing the method 900. The trigger maybe the sound of a doorbell or alarm being detected or visual detection of a door opening or a person or animal entering a room or within a certain distance of the user of the playback device. In step 916 a check is made as to whether an environmental trigger was detected. If an environmental trigger was detected, operation proceeds from step 916 to step 982 of FIG. 9C via connecting node B 918. However, if a trigger was not detected in step 916, operation returns from step 916 to step 914. It should be appreciated that while the processing initiated due to the detection of an environmental trigger proceeds the monitoring in step 914 and check 918 may still be, and sometimes are, performed on an ongoing or periodic basis in an attempt to detect and initiate processing with regard to one or more additional triggers.

In step 920, the playback device monitors for a trigger included in content being presented to the user, e.g., a trigger embedded with audio and/or video content being decoded and played back to the user or included in an auxiliary channel sent with the audio and video content being played and presented to the user. The trigger may be something that is not something that is detectable to the user of the playback device, but which can be detected by the processor of the playback device. In step 922, a check is made as to whether a trigger included in content was detected. If a trigger included in content, e.g., a program, being presented is detected operation proceeds from step 922 to step 1122 of FIG. 9D via connecting node C 924. However, if a trigger was not detected in step 922, operation returns from step 922 to step 920. It should be appreciated that while the processing initiated due to the detection of a trigger included in content proceeds the monitoring in step 920 and check 922 may still be, and sometimes are, performed on an ongoing or periodic basis in an attempt to detect and initiate processing with regard to one or more additional triggers.

In step 926 the playback device monitors the user for an action or other user activity which would trigger a user action related trigger. In some embodiments the user related trigger maybe the user looking at a particular portion of a screen or displayed image during a portion of a presentation. Accordingly, at least in some embodiments, step 926 includes monitor for user motion, user input, e.g., touching of a control, and/or monitoring of the area of visual focus, e.g., where a user is looking with regard to the display screen or portion of a scene being presented to the user.

In step 928, a check is made as to whether a user activity-based trigger was detected. If a user activity-based trigger is detected, operation proceeds from step 928 to step 1142 of FIG. 9E via connecting node D 930. However, if a trigger was not detected in step 928, operation returns from step 928 to step 926. It should be appreciated that while the processing initiated due to the detection of a user action-based trigger proceeds the monitoring in step 926 and check 928 may still be, and sometimes are, performed on an ongoing or periodic basis in an attempt to detect and initiate processing with regard to one or more additional triggers.

Referring now to FIG. 9B, which is called when a trigger from an external system is detected, operation proceeds to step 941 in which the type of trigger that was detected is determined so that processing corresponding to the particular type of detected trigger can be initiated. Step 941 includes, in some embodiments, steps 942 and 960. In step 942, a check is made to determine if the detected trigger was an incoming call notification, e.g., from a telephone system. If the detected trigger was an incoming call notification, operation proceeds to step 944, otherwise it proceeds to step 960. In step 960, a check is made as to whether the detected trigger was a doorbell or alarm system signal. If it was a doorbell or alarm system signal operation proceeds from step 960 to step 962, otherwise operation proceeds from step 960 to step 972 in which an action corresponding to the particular detected trigger is implemented. In step 972, a user-selected or defined action stored in memory of the playback device may be and sometime is implemented in response to a user specified trigger. For example, in some embodiments, a water alarm or a power supply alarm may be used to trigger a user-specified action, such as turning on a sump pump in the case of a water alarm or shutting down a computer system or the playback system in the case of a power supply alarm. The alarm may also trigger interruption of the presentation and notification to the user of the alarm condition, e.g., via a pop-up window or window displayed while playback of the presentation to the user is paused to make the user aware of the alarm. Operation proceeds form step 972 back to monitoring step 903 via connecting node 958 which is used to show that monitoring for triggers will continue even after an action is taken in response to detecting and acting on a trigger.

Referring once again to step 944, which will be invoked when an incoming call notification is detected, in step 944 the display of the immersive content to the user of the playback device is paused, then in step 946 a pause indication is presented to the user and in step 948 caller ID information is displayed to the user on a display along with call notification so that the user is aware of the incoming call and also who the caller is. In step 950, the user is provided call control options, e.g., the option of accepting the call, rejecting the call, or sending it to voice is presented to the user. User input is then received by the playback device and in step 952 the call is responded to in accordance with the received user input. In step 954, termination of the call is detected, e.g., after it is answered or because of another action and then in step 956 the pause is ended, and normal VR/AR content playback is resumed. In this way a user can be notified of an incoming call and be allowed to respond to the call without having to remove a headmounted display with the playback system optionally providing the call interface including mic, speaker and/or other device through which the call is handled and completed. Operation proceeds from step 956 to step 903 via connecting node 958.

If the trigger from an external system that was detected was a doorbell, operation would proceed to step 962 as discussed above. In step 962 the display of immersive content is paused. In step 964 images of the environment are captured, e.g., in this case the images corresponding to the environment where the doorbell was triggered. The image capture maybe and sometimes is by a camera on the doorbell. Operation proceeds from step 964 to step 966 in which the captured images of the environment are displayed by the playback system to the user, e.g., so he can see who is at the door without having to remove a head mounted display of the playback system on which images are displayed. The images are displayed in some cases in a picture in picture window to minimize the effect on the VR or AR experience. In step 968 the end of the alarm is detected, e.g., the user of the playback device signals via input to the playback device that the door bell or alarm has been responded to or the door bell system detects that the person who activated the door bell has left the area of the door bell and is no longer present near the door adjacent the door bell.

Operation proceeds from step 968 to step 970 in which the pause of the VR/AR experience is canceled and normal output of immersive content is resumed. In this way a user can respond to a doorbell and, assuming the person leaves, can resume the VR experience without having to even remove their head mounted display. Operation proceeds from step 970 to step 903 via connecting node 958.

The steps shown in FIG. 9C will now be described. Step 982 of FIG. 9C is reached via connecting node 918 in response to an environmental trigger being detected where the trigger may be an audio or video trigger. In step 982, a determination is made if the detected trigger was a captured speech trigger, e.g., detecting of speech by a person in the room in which the user and playback device is located. If the triggers were detected, speech operation proceeds to step 984 in which the audio output of the playback device is lowered or stopped to allow the user to hear the speech. Then, in step 986, an external view of the environment of the room in which the user is located is revealed to the user. In some embodiments this involves displaying a vide of an image of the room captured by a camera on the headmounted display of the playback device being used by the user so that the user does not need to remove the headmounted display he is wearing to see what is going on, e.g., who is speaking, Alternatively the playback device alters the display to allow a user to view through a portion of the headmounted display screen. In this way the user can see what is going on without removing the head mounted display he is wearing. In step 988, video and/or audio output is continued but at the reduced level and with the user being able to see at least a portion of the environment in which he is located. In step 990, monitoring for user input signaling that normal output should be resumed or for a silence lasting a predetermined amount of time is performed. Either user input or a silence period can be, and sometimes is, used to trigger resumption of normal output. In step 992, a check is made to determine if user input indicating normal playback should be resumed or silence for the time required to trigger automatic resumption of normal playback was detected. If either of these conditions used to trigger normal resumption of playback was detected in step 992, operation proceeds to step 994, otherwise operation returns to monitoring step 990.

In step 994, a PIP or viewing window which was used to allow the user to see a portion of the environment in the room where the speech was detected and the user is located is closed and then, in step 996, normal audio output and playback operation is resumed before operation returns via connecting node 958 to monitoring step 903.

If, in step 982, it is determined that captured speech was not the detected trigger, operation proceeds to step 1000 in which a check is made if the detected environmental trigger was audio or video indicative of a pet or person entering the room. In such a case, the user may want to be made aware of the presence of the person or pet which they may not see or hear due to the wearing of a head mounted display of the playback device. In step 1000, if the trigger was not due to a pet or person entering the room in which the user is located, operation proceeds to step 1010 in which an action corresponding to the detected environmental triggers is taken prior to operation returning to monitoring step 903 via connecting node 958.

In step 1000, if it is determined that the detected environmental trigger corresponded to a pet or person entering the room in which the user is located, operation proceeds from step 1000 to step 1002 in which the user is presented on the head mounted display with an image captured by a camera, e.g., mounted on the same head mount as the display, but facing outward from the user of the playback device.

After display of one or more captured images operation proceeds to optional step 1004 in which the audio output is stopped or reduced. Operation then proceeds to step 1006 in which the playback device, using the camera on the headmount, mic or another sensor, monitors for the pet or person leaving the room. In step 1008, normal operation, e.g., playback of a presentation, is resumed in response to detecting one of the pet or person who entered the room leaving the room or user input signaling that normal output should be resumed, e.g., because the user having been made aware of the presence of the person or pet seeks to ignore their presence. Operation proceeds from step 1008 back to monitoring step 903 via connecting node X 958.

Responding to detection of a content-based trigger will now be discussed with regard to FIG. 9D. As previously discussed, step 1102 of FIG. 9D will be reached in response of a content-based trigger being detected. In step 1102, a check is made to determine if the content-based trigger is part of a broadcast alert, e.g., a live broadcast alert such as what might be expected in the case of a weather or national emergency alert that might interrupt or be sent with a broadcast program. If, in step 1102, is determined that the content-based trigger is a live broadcast alert, operation proceeds to step 1104 in which information about the alert is provided, e.g., displayed, on a portion of the head mounted display in place of program content that was being played back to the user as part of a VR or AR experience. Then, in step 1106, the user is presented with the option of viewing the live program alert instead of the AR/VR program content or returning to the VR/AR program and ignoring the alert. The playback device monitors for user input in step 1108 and then the device checks in step 1110 if the user has selected the live program option, e.g., in which the user will be displayed the live program content, e.g., alert program content in step 112 or if the user selected to resume normal VR/AR output in which case in step 113 normal playback will be resumed and the playback device will not switch to outputting the live program content corresponding to the received alert of which the user was made aware. Operation proceeds from steps 1112 or 1113 back to step 903 via connecting node 958.

In step 1102, if it is determined that the detected alert does not relate to a live broadcast program alert indicating a live program broadcast to which the device could switch, operation proceeds to step 1114. In step 1114, a check is made to determine if the content-based trigger that was detected including information indicated that a fully immersive version of content being presented in augmented reality mode is available, i.e., to make the user aware that a fully immersive VR experience is available as an alternative to an AR experience. If the content based trigger indicated that an VR option is available, the user is presented in step 116 with the option to switch to the fully immersive VR experience, In step 1118 user input is checked to determine if the user has selected to switch to the fully immersive version of the program being provided to the user as an AR experience. If the user selects the fully immersive version, operation proceeds form step 1118 to step 1120 in which the full display area of the head mounted display is occupied with immersive content. If, however, in step 1118, it is determined that the user did not choose to switch to the fully immersive experience, the playback device continues in step 1122 to output some real content with augmented reality content with the user seeing some real content with some synthetic or recorded content. Operation proceeds from steps 1120 and 1122 to step 903 via connecting node X 958.

If, in step 1114, it was determined that the detected content-based trigger was not providing the user the opportunity to select a fully immersive experience instead of an AR experience, operation proceeds to step 1124 wherein a check is made to determine if the detected trigger is a trigger which provides the user a social co-viewing opportunity. If, in step 1124, it is determined that the detected content-based trigger is a trigger intended to provide the user an option to join a co-viewing experience with another user, operation proceeds to step 1126 in which the user is presented, e.g., on the display, with an option to join a co-viewing experience with a user of another playback device. Operation proceeds from step 1126 to step 1128 in which a check is made to determine if the user selected the co-viewing experience. If a co-viewing experience was selected by the user, operation proceeds to step 1130 where a co-viewing experience is provided to the user with the user being presented, e.g., with some content being viewed by another playback device user.

If the co-viewing experience was not selected normal, operation continues with operation proceeding to step 903 via connecting node 958.

If in step 1124 it is determine that a co-viewing related content trigger was not detected operation proceeds to step 1132 in which an action corresponding to the detected trigger is implemented prior to operation returning to step 903 via connecting node x 958.

The steps of FIG. 9E will now be described. Step 1142 is reached via connecting node 930. In step 1142 a check is made to determine if the detected user activity based trigger is detection of user inactivity for a period of time, while immersive content is displayed on a limited portion of the display as may be the case in an experience which is not fully immersive. If the answer to the check in step 1142 is yes, operation proceeds to step 1144 in which the area of the display used to display immersive content is increased to occupy the full display area thereby automatically switch a still or inactive user to a fully immersive experience. If, in step 1142, the answer is no, operation proceeds to step 1148 in which a check is made to determine if the user activity-based trigger is a user failure to respond or take no action in response to a change in playback due to detection of a trigger. If the answer in step 1148 is yes, operation proceeds to step 1150 and the area of display used to display immersive content is increased to fully occupy the user's field of view. If the answer in step 1148 is no, operation proceeds to step 1152 in which an action is taken corresponding to the detected trigger before operation returns to monitoring step 903 via connecting node X 958.

While steps are shown in an exemplary order it should be appreciated that in many cases the order of the steps may be altered without adversely affecting operation. Accordingly, unless the exemplary order of steps is required for proper operation, the order of steps is to be considered exemplary and not limiting.

Some embodiments are directed a non-transitory computer readable medium embodying a set of software instructions, e.g., computer executable instructions, for controlling a computer or other device to encode and compresses stereoscopic video. Other embodiments are embodiments are directed a computer readable medium embodying a set of software instructions, e.g., computer executable instructions, for controlling a computer or other device to decode and decompresses video on the player end. While encoding and compression are mentioned as possible separate operations, it should be appreciated that encoding may be used to perform compression and thus encoding may, in some include compression. Similarly, decoding may involve decompression.

The techniques of various embodiments may be implemented using software, hardware and/or a combination of software and hardware. Various embodiments are directed to apparatus, e.g., an image data processing system. Various embodiments are also directed to methods, e.g., a method of processing image data. Various embodiments are also directed to a non-transitory machine, e.g., computer, readable medium, e.g., ROM, RAM, CDs, hard discs, etc., which include machine readable instructions for controlling a machine to implement one or more steps of a method.

Various features of the present invention are implemented using modules. Such modules may, and in some embodiments are, implemented as software modules. In other embodiments the modules are implemented in hardware. In still other embodiments the modules are implemented using a combination of software and hardware. In some embodiments the modules are implemented as individual circuits with each module being implemented as a circuit for performing the function to which the module corresponds. A wide variety of embodiments are contemplated including some embodiments where different modules are implemented differently, e.g., some in hardware, some in software, and some using a combination of hardware and software. It should also be noted that routines and/or subroutines, or some of the steps performed by such routines, may be implemented in dedicated hardware as opposed to software executed on a general-purpose processor. Such embodiments remain within the scope of the present invention. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods. Accordingly, among other things, the present invention is directed to a machine-readable medium including machine executable instructions for causing a machine, e.g., processor and associated hardware, to perform one or more of the steps of the above-described method(s).

Numerous additional variations on the methods and apparatus of the various embodiments described above will be apparent to those skilled in the art in view of the above description. Such variations are to be considered within the scope.

What is claimed is:

1. A method of operating a playback system, the method comprising:
   presenting, on a display of the playback system, a first immersive content item in a first immersive presentation mode comprising a first set of presentation characteristics, wherein the first immersive content item is presented as part of an immersive content playback session;
   detecting, by the playback system, a trigger external to the immersive content playback session;
   in response to detecting the trigger external to the immersive content playback session:
      determining a trigger type of the detected trigger, wherein the trigger type is at least one of a first type and a second type;
      determining, based on the trigger type of the detected trigger, an interface associated with the detected trigger, the interface comprising a second immersive content item associated with the detected trigger;
      modifying, by the playback system, the first set of presentation characteristics in accordance with the trigger type to obtain a second immersive presentation mode comprising a second set of presentation characteristics; and
      presenting, on the display of the playback system, the interface associated with the detected trigger concurrently with the first immersive content item in the second immersive presentation mode.

2. The method of claim 1, wherein the trigger type of the detected trigger is an environmental trigger type and wherein the second immersive content item comprises a video stream captured by a camera oriented towards an area of an environment from which the detected trigger was initiated.

3. The method of claim 2, wherein detecting the trigger comprises detecting a person or animal has entered an area of an environment in which a user of the playback system is located, and wherein the camera oriented towards the area of the environment from which the detected trigger was initiated comprises a head-mounted camera facing away from the user.

4. The method of claim 1, further comprising:
   detecting at least one of an input indicative of a return to the first immersive presentation mode and inactivity of the interface associated with the detected trigger during a predetermined length of time after detecting the trigger; and
   presenting, on the display of the playback system and in response to detection of at least one of the input and the inactivity during the predetermined length of time, the first immersive content item in the first immersive presentation mode.

5. The method of claim 1, wherein the trigger type of the detected trigger is an incoming communication notification type, and wherein the interface associated with the detected trigger comprises an incoming communication notification and at least one communication response option.

6. The method of claim 1, wherein the trigger type of the detected trigger is content-based trigger type, and wherein the interface associated with the detected trigger type comprises a co-viewing experience option.

7. The method of claim 1, wherein the first and second immersive content items comprise media content items.

8. The method of claim 1, wherein the second immersive content item comprises a video stream.

9. The method of claim 1, wherein the concurrent presentation of the interface of the detected trigger and the first immersive content item provides functionality for a user to respond to the detected trigger via the interface without exiting an immersive experience.

10. The method of claim 1, further comprising:
    in response to the detected trigger being the first type, modifying the first set of presentation characteristics with presentation characteristics associated with the first type; and
    in response to the detected trigger being the second type, modifying the first set of presentation characteristics with presentation characteristics associated with the second type.

11. A playback system, comprising:
    a receiver configured to detect a trigger external to the playback system;
    a display;
    a camera; and
    a processor configured to:
       cause a first immersive content item to be presented on the display in a first immersive presentation mode comprising a first set of presentation characteristics, wherein the first immersive content item is presented as part of an immersive content playback session;
       determine a trigger type of the detected trigger, wherein the trigger type is at least one of a first type and a second type;
       determine, based on the type of the detected trigger, an interface associated with the detected trigger and comprising a second immersive content item associated with the detected trigger, wherein the detected trigger corresponds to activity occurring external to the immersive content playback session and wherein the second immersive content item is a video image captured by the camera of a surrounding area in which a user of the playback system is located;
       modify the first set of presentation characteristics in accordance with the trigger type to obtain a second immersive presentation mode comprising a second set of presentation characteristics; and
       cause the interface associated with the detected trigger to be presented on the display concurrently with the first immersive content item, wherein the processor is further configured to cause the first immersive content item to be displayed in the second immersive presentation mode.

12. The playback system of claim 11, wherein the receiver is further configured to detect at least one of a trigger signal from an external system, an environmental based trigger; and a content based trigger.

13. The playback system of claim 11, wherein the interface associated with the detected trigger comprises a pause indicator.

14. The playback system of claim 11, wherein the first and second immersive content items comprise media content items.

15. The playback system of claim 11, wherein the second immersive content item comprises a video stream.

16. The playback system of claim 11, wherein the concurrent presentation of the interface of the detected trigger and the first immersive content item provides functionality for a user to respond to the detected trigger via the interface without exiting an immersive experience.

\* \* \* \* \*